United States Patent
Wang et al.

(10) Patent No.: US 12,043,783 B2
(45) Date of Patent: Jul. 23, 2024

(54) LIQUID CRYSTAL COMPOSITION CONTAINING BENZOCHROMENE COMPOUND AND USE THEREOF

(71) Applicant: SHIJIAZHUANG CHENGZHI YONGHUA DISPLAY MATERIAL CO., LTD., Shijiazhuang Hebei (CN)

(72) Inventors: Xiaolong Wang, Shijiazhuang Hebei (CN); Qing Cui, Shijiazhuang Hebei (CN); Yunxia Qiao, Shijiazhuang Hebei (CN); Yan Wang, Shijiazhuang Hebei (CN); Shuai Zhao, Shijiazhuang Hebei (CN); Hao Liu, Shijiazhuang Hebei (CN)

(73) Assignee: SHIJIAZHUANG CHENGZHI YONGHUA DISPLAY MATERIAL CO., LTD., Shijiazhuang Hebei (CN)

( * ) Notice: Subject to any disclaimer, the term of this patent is extended or adjusted under 35 U.S.C. 154(b) by 0 days.

(21) Appl. No.: 18/056,586

(22) Filed: Nov. 17, 2022

(65) Prior Publication Data
US 2023/0167363 A1    Jun. 1, 2023

(30) Foreign Application Priority Data
Nov. 29, 2021   (CN) .......................... 202111433203.6

(51) Int. Cl.
G02F 1/1333   (2006.01)
C09K 19/12    (2006.01)
C09K 19/30    (2006.01)
C09K 19/34    (2006.01)

(52) U.S. Cl.
CPC .......... *C09K 19/3405* (2013.01); *C09K 19/12* (2013.01); *C09K 19/3003* (2013.01); *C09K 19/3402* (2013.01); *C09K 2019/123* (2013.01); *C09K 2019/124* (2013.01); *C09K 2019/3004* (2013.01); *C09K 2019/301* (2013.01); *C09K 2019/3016* (2013.01); *C09K 2019/3408* (2013.01); *C09K 2019/3422* (2013.01); *C09K 2019/3425* (2013.01)

(58) Field of Classification Search
CPC ................ C09K 19/3405; C09K 19/12; C09K 19/3003; C09K 19/3402; C09K 2019/123; C09K 2019/124; C09K 2019/3004; C09K 2019/301; C09K 2019/3016; C09K 2019/3408; C09K 2019/3422; C09K 2019/3425; G02F 1/1333
See application file for complete search history.

(56) References Cited

U.S. PATENT DOCUMENTS

| | | | |
|---|---|---|---|
| 7,326,447 B2 * | 2/2008 | Taugerbeck ......... | C07D 311/80 252/299.61 |
| 2023/0167363 A1 * | 6/2023 | Wang ................. | C09K 19/3405 252/299.61 |

FOREIGN PATENT DOCUMENTS

CN       111484475      *   8/2020   ............. C09K 19/34

* cited by examiner

*Primary Examiner* — Geraldina Visconti
(74) *Attorney, Agent, or Firm* — Muncy, Geissler, Olds & Lowe, P.C.

(57) ABSTRACT

A liquid crystal composition containing a benzochromene compound and the use thereof in a liquid crystal display element or liquid crystal display. The liquid crystal composition comprises one or more compounds represented by Formula I and one or more compounds represented by Formula II. The liquid crystal composition has the characteristics of a small rotational viscosity, a large elastic constant, a high transmittance, a fast response speed, a strong resistance to ultraviolet light irradiation, and a high long-time light stability, and is particularly suitable for the field of TV display.

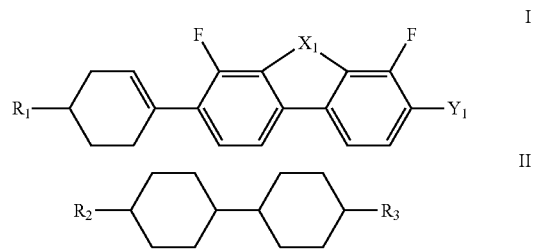

10 Claims, No Drawings

LIQUID CRYSTAL COMPOSITION CONTAINING BENZOCHROMENE COMPOUND AND USE THEREOF

TECHNICAL FIELD

The present invention relates to the technical field of liquid crystal materials. In more particular, the present invention relates to a liquid crystal composition containing a benzochromene compound and the use thereof in a liquid crystal display element or liquid crystal display.

BACKGROUND ART

TFT-LCD (Thin Film Transistor Liquid Crystal Display) is the most mature technology in the field of flat panel display, and is very widely applied in the display fields of mobile phones, tablet computers, notebook computers, vehicle display, industrial control display, TVs, etc. AMO-LED (Active Matrix Organic Light Emitting Diode) display technology has also been developing in recent years. Due to the characteristics of its high brightness, high contrast ratio, bendability and flexibility, AMOLED has been widely used in small-sized display devices such as smart phones and smart wearable devices and is gradually replacing TFT-LCD for application in small-sized display devices. However, since AMOLED technology currently still has technical problems in terms of service life, reliability etc., TFT-LCD display devices is still dominant among medium and large size display devices such as computer monitors, vehicle-mounted displays and TVs. In order to compete with AMO-LED, it is very important to improve the brightness, contrast ratio, etc. of TFT-LCD display devices.

Depending on the dielectric anisotropy of the liquid crystal material, LCD display devices can be divided into positive dielectric anisotropy and negative dielectric anisotropy, wherein positive dielectric anisotropy refers to those with dielectric anisotropy greater than zero, and negative dielectric anisotropy refers to those with dielectric anisotropy less than zero. In recent years, whether negative dielectric anisotropy liquid crystal display materials or negative dielectric anisotropy liquid crystal display modes have become the focus of research in the technical field of liquid crystal materials. However, due to the inherent characteristics of negative dielectric anisotropy liquid crystal materials, negative dielectric anisotropy liquid crystal materials have a slow response speed and a poor reliability compared with positive dielectric anisotropy liquid crystal materials and have a higher risk of residual image defects. Therefore, in the field of TV display where the requirements for response speed and residual image are becoming more and more stringent, positive dielectric anisotropic liquid crystal materials still have certain advantages and are a subject worthy of continuous research.

In recent years, people's demand for visual experience brought by TV is continuously increasing. The resolution is constantly improving and has developed from 4K to 8K. The size of TV is also increasing. 65 inch TVs have gradually replaced 55 inch TVs as the mainstream products on the market, and there is a trend of developing 75-inch and 85-inch TVs in the future. Mini LED (Mini Light Emitting Diode) technology is recently the key direction of research and development in the new display industry. Compared with traditional lateral backlight LCD TVs, the performance of LCD TVs with mini LED as backlight is improved in terms of contrast ratio, brightness, color gamut and viewing angle. In 2021, TCL, Samsung, LG, Skyworth, Konka and other brands respectively released TVs equipped with mini LED backlight. The application of LCD TVs with mini LED as backlight will also become more and more extensive in the future.

At present, high-resolution display screens have to face the problem of a panel having a reduced aperture ratio, which leads to the decrease of the brightness of the display screen. In order to obtain a higher brightness of display picture, it can be solved by increasing the brightness of the backlight or the transmittance of the liquid crystal material. The brightness of mini LED as backlight is very high, and the brightness of 4K resolution display screen is 1800 nit. This requires that liquid crystal materials cannot be easily aged under long-time irradiation by high-brightness backlight. However, backlight is the most energy consuming component of TV. If the backlight can be effectively used, not only can the energy source be effectively saved, but also the brightness of the display screen can be improved. Therefore, improving the transmittance of liquid crystal materials to solve the problem of reduced aperture ratio has become a method of killing two birds with one stone.

SUMMARY OF THE INVENTION

Based on the above facts, an object of the present invention is to provide a liquid crystal composition containing a benzochromoene compound, wherein the liquid crystal composition has the characteristics of a small rotational viscosity, a large elastic constant, a high transmittance, a fast response speed, a strong resistance to ultraviolet light irradiation, and a high long-time light stability, and is particularly suitable for the field of television display.

To achieve the first object above, the present invention uses the following technical solution:

A liquid crystal composition containing a benzochromene compound, characterized in that the liquid crystal composition comprises one or more compounds represented by Formula I and one or more compounds represented by Formula II:

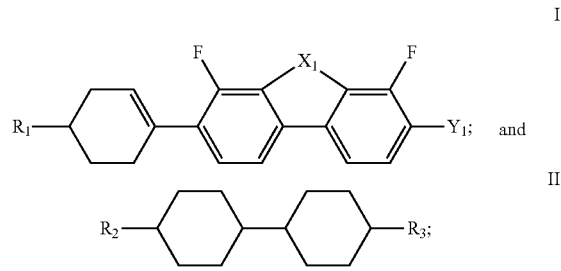

wherein in Formula I, $R_1$ represents an alkyl with a carbon atom number of 1-10, an alkyl with a carbon atom number of 1-10 or an alkenyl with a carbon atom number of 2-10, $X_1$ represents $CH_2O$ or $OCH_2$ and $Y_1$ represents $CF_3$ or $OCF_3$; and in Formula II, $R_2$ and $R_3$ each independently represent an alkyl with a carbon atom number of 1-10 or an alkenyl with a carbon atom number of 2-10, and at least one of $R_2$ and $R_3$ represents an alkenyl with a carbon atom number of 2-10.

Furthermore, in the compound represented by Formula I, $R_1$ represents an alkyl with a carbon atom number of 1-10, $X_1$ represents $OCH_2$, and $Y_1$ represents $OCF_3$.

Furthermore, the liquid crystal composition further comprises one or more compounds selected from those represented by Formulas III to XI:

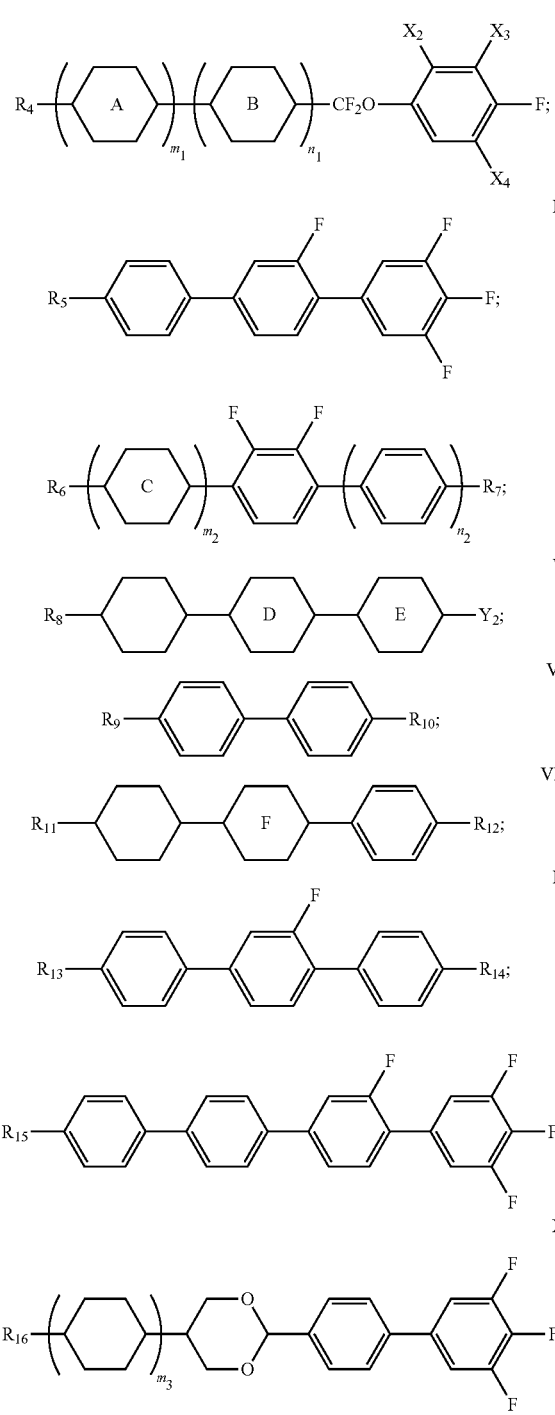

The liquid crystal composition in the present invention is a positive dielectric anisotropic liquid crystal composition, which is suitable for the field of TV display.

Another object of the present invention is to provide a liquid crystal display element or liquid crystal display, wherein the liquid crystal display element or liquid crystal display comprises the liquid crystal composition of the present invention, and the liquid crystal display element or liquid crystal display is an active matrix display element or display.

Furthermore, the liquid crystal display element or liquid crystal display is a liquid crystal display element or liquid crystal display with mini LED as backlight.

Furthermore, the liquid crystal display element or liquid crystal display is used in the field of TV display.

The Present Invention has the Following Beneficial Effects

The liquid crystal composition provided by the present invention has the characteristics of a small rotational viscosity, a large elastic constant, a high transmittance, a fast response speed, a strong resistance to ultraviolet light irradiation, and a high long-time light stability, and is particularly suitable for the field of TV display. The TV display containing same has a high transmittance, a low energy consumption and no residual image after long-time backlight irradiation, and is suitable for making large-size mini LED backlight TV displays.

DETAILED DESCRIPTION OF EMBODIMENTS

In order to explain the present invention more clearly, the present invention will be further explained below in conjunction with preferred examples. A person skilled in the art should understand that the following detailed description is illustrative rather than restrictive, and should not limit the scope of protection of the present invention.

[Liquid Crystal Composition]

A liquid crystal composition containing a benzochromene compound, wherein the liquid crystal composition comprises one or more compounds represented by Formula I and one or more compounds represented by Formula II:

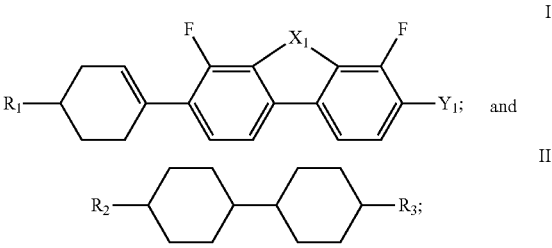

wherein in Formula I, $R_1$ represents an alkyl with a carbon atom number of 1-10, an alkyl with a carbon atom number of 1-10 or an alkenyl with a carbon atom number of 2-10, $X_1$ represents $CH_2O$ or $OCH_2$ and $Y_1$ represents $CF_3$ or $OCF_3$; and in Formula II, $R_2$ and $R_3$ each independently represent an alkyl with a carbon atom number of 1-10 or an alkenyl with a carbon atom number of 2-10, and at least one of $R_2$ and $R_3$ represents an alkenyl with a carbon atom number of 2-10.

In the above-mentioned liquid crystal composition, in percentage by mass, the content of the compound represented by Formula I is 1-30%, preferably 1-20%, further preferably 1-15%, and the content of the compound represented by Formula II is 10% or more, preferably 20-70%, further preferably 30-60%.

Preferably, the above-mentioned compound represented by Formula I is selected from the group consisting of compounds represented by Formulas I-1 to I-4:

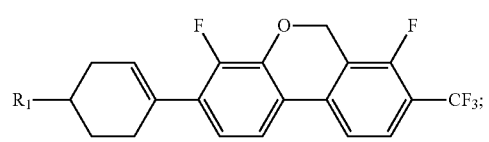
I-1

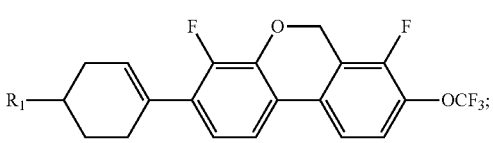
I-2

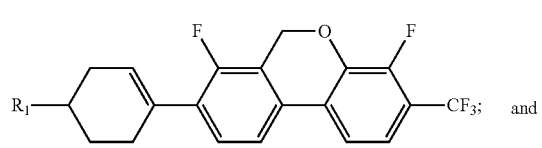
I-3 and

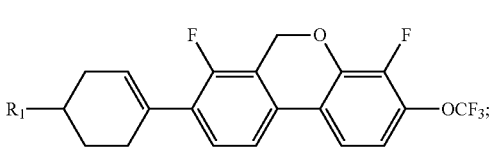
I-4 wherein R₁ represents an alkyl with a carbon atom number of 1-10.

Further preferably, the above-mentioned compound represented by Formula I is selected from the group consisting of compounds represented by Formulas I-2-1 to I-2-5:

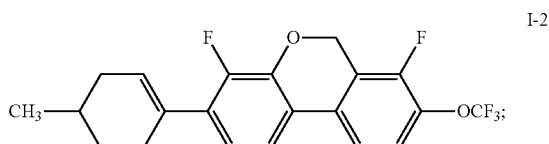
I-2-1

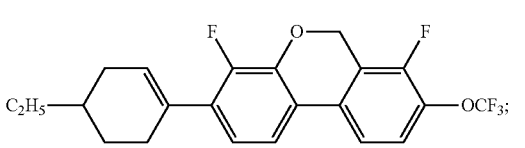
I-2-2

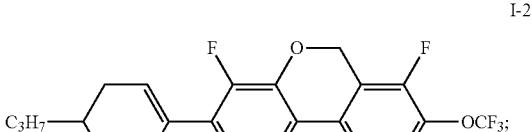
I-2-3

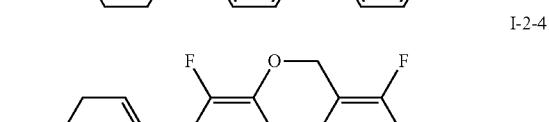
I-2-4 and

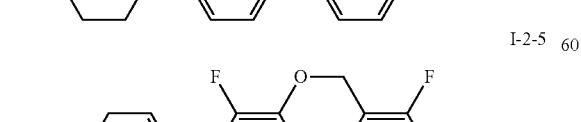
I-2-5

Preferably, the above-mentioned compound represented by Formula II is selected from the group consisting of compounds represented by Formulas II-1 to II-15:

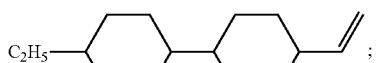
II-1

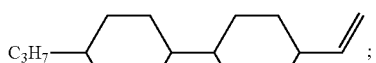
II-2

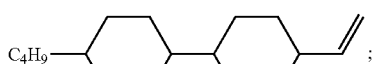
II-3

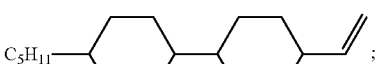
II-4

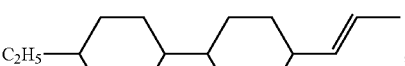
II-5

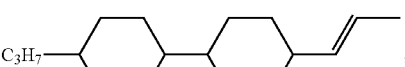
II-6

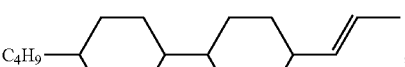
II-7

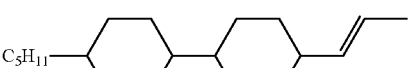
II-8

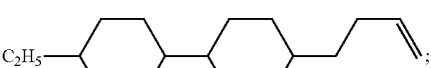
II-9

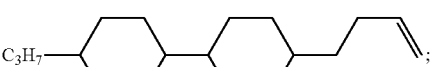
II-10

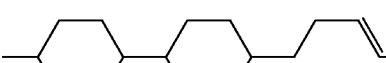
II-11

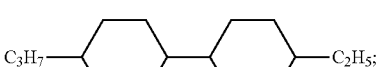
II-12

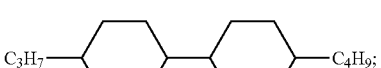
II-13

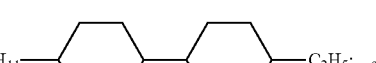
II-14 and

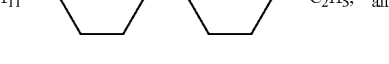
II-15

The liquid crystal composition of the present invention preferably further comprises one or more compounds represented by Formula III:

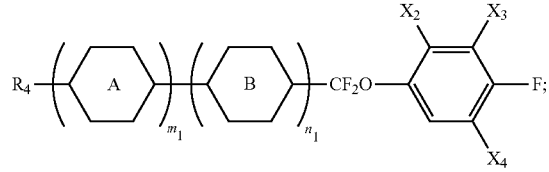

wherein in Formula III, R$_4$ represents an alkyl with a carbon atom number of 1-10, and any one or more non-contiguous —CH$_2$— in the group represented by R$_4$ is optionally replaced by cyclopropylene or cyclopentylene;

X$_2$ represents H or CH$_3$, X$_3$ and X$_4$ each independently represent H or F, and m$_1$ and n$_1$ each independently represent 1 or 2;

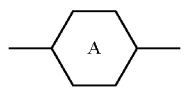

represents

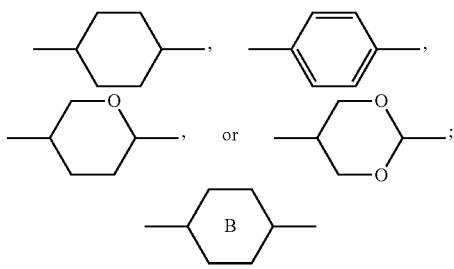

and represents

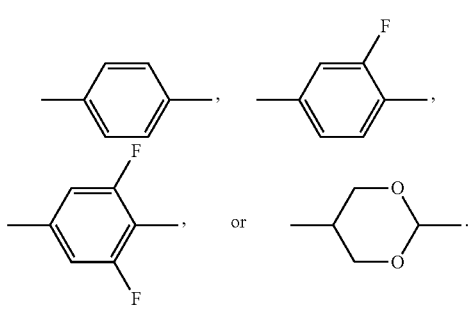

In the above-mentioned liquid crystal composition, in percentage by mass, the content of the compound represented by Formula III is 1-40%, preferably 1-30%, further preferably 1-20%.

Preferably, the above-mentioned compound represented by Formula III is selected from the group consisting of compounds represented by Formulas III-1 to III-28:

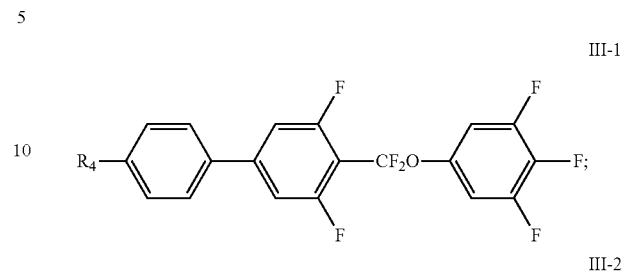

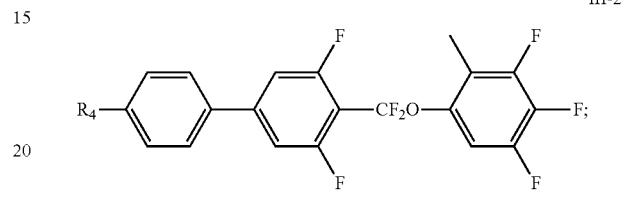

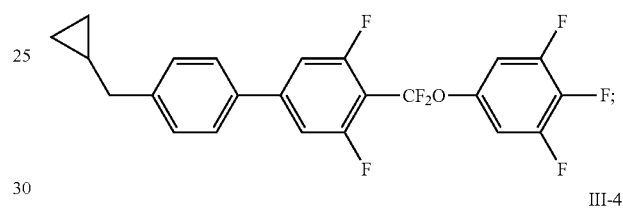

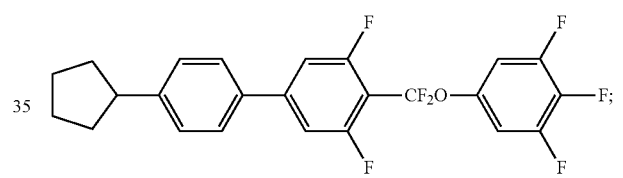

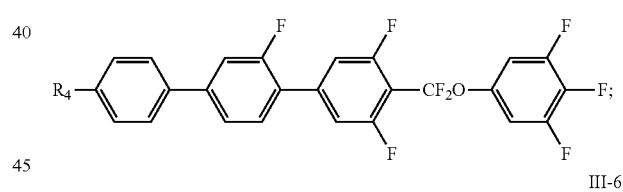

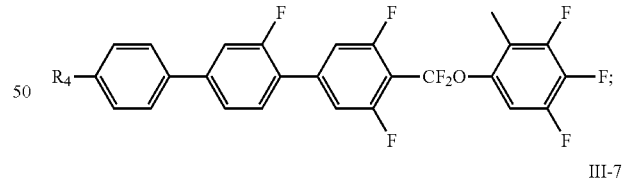

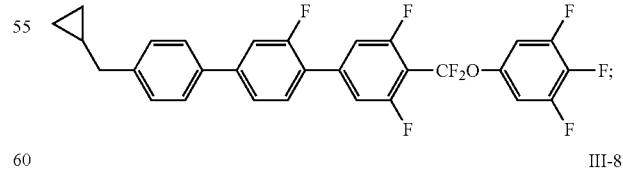

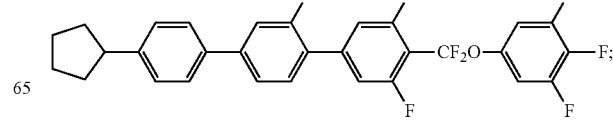

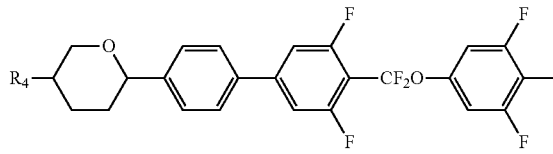
III-9
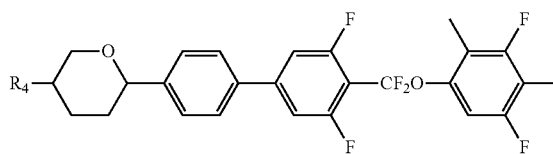
III-10
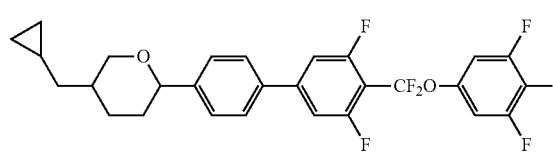
III-11
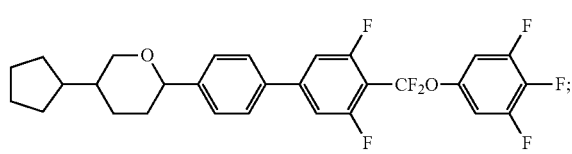
III-12
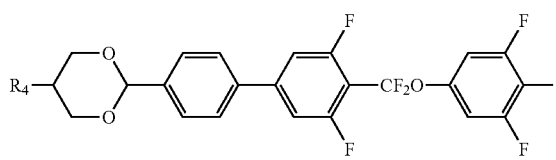
III-13
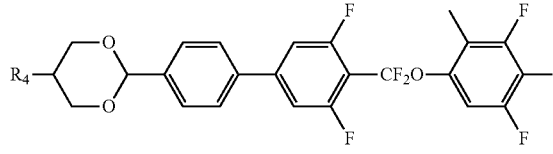
III-14
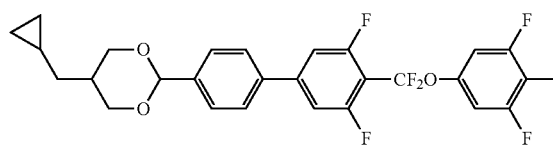
III-15
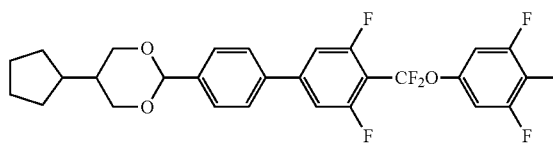
III-16
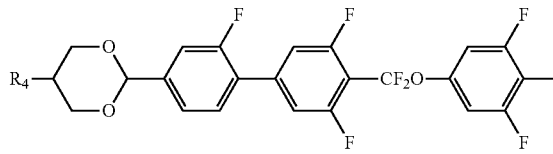
III-17
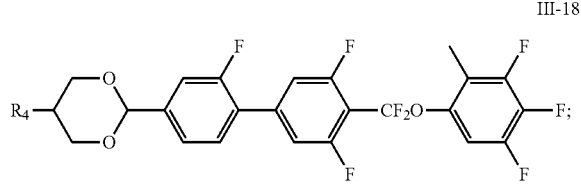
III-18
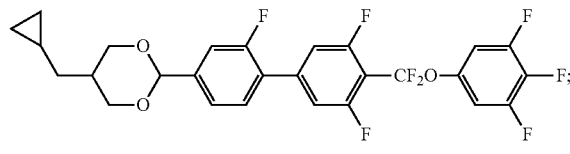
III-19
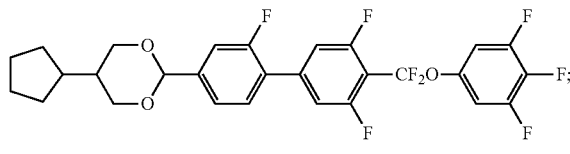
III-20
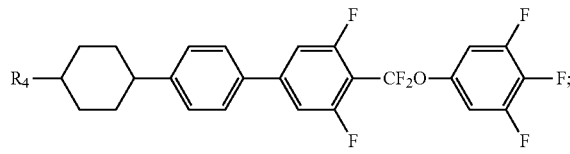
III-21
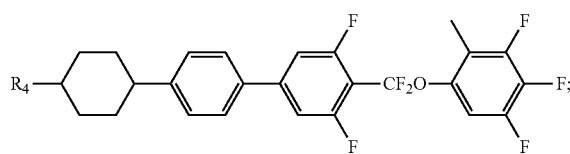
III-22
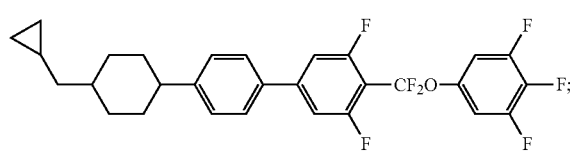
III-23
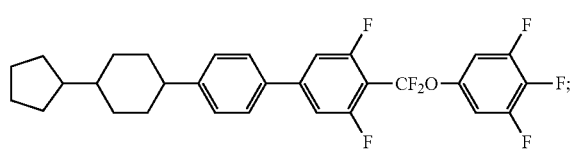
III-24
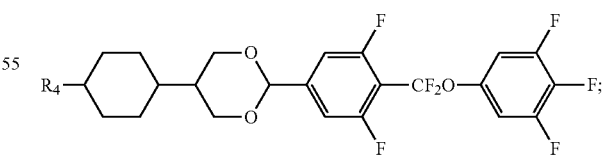
III-25
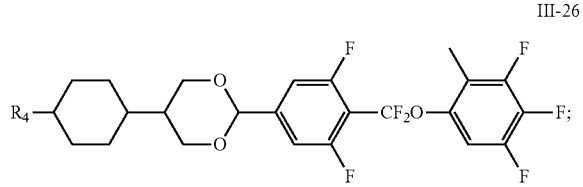
III-26

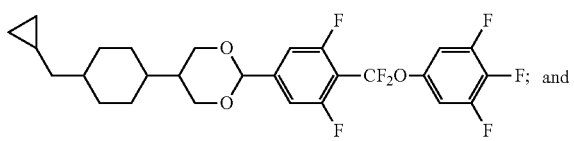

III-27

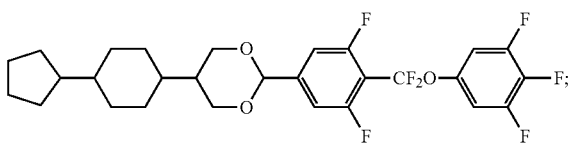

III-28 wherein $R_4$ represents an alkyl with a carbon atom number of 1-5.

Further preferably, the above-mentioned liquid crystal composition comprises at least two compounds selected from those represented by Formulas III-1 to III-28.

Still further preferably, the above-mentioned liquid crystal composition comprises at least three compounds selected from those represented by Formulas III-1 to III-28.

The liquid crystal composition of the present invention preferably further comprises one or more compounds represented by Formula IV:

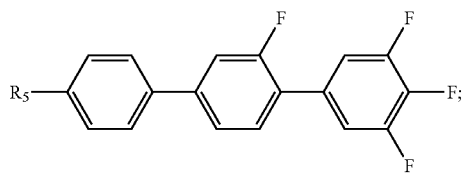

IV wherein in Formula IV, $R_5$ represents an alkyl with a carbon atom number of 1-10.

In the above-mentioned liquid crystal composition, in percentage by mass, the content of the compound represented by Formula IV is 1-20%, preferably 1-18%, further preferably 1-14%.

Preferably, the above-mentioned compound represented by Formula IV is selected from the group consisting of compounds represented by Formulas IV-1 to IV-5:

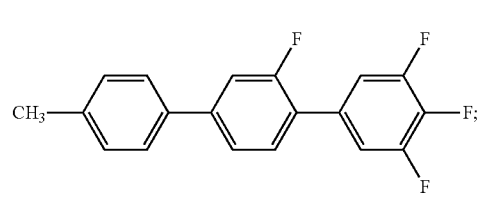

IV-1

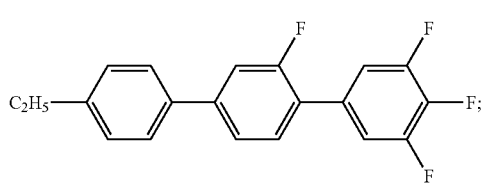

IV-2

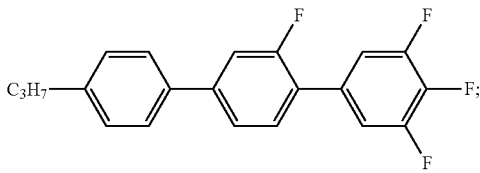

IV-3

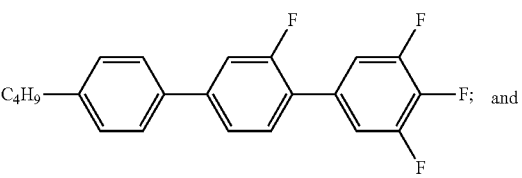

IV-4

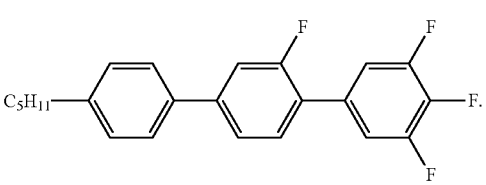

IV-5

The liquid crystal composition of the present invention preferably further comprises one or more compounds represented by Formula V:

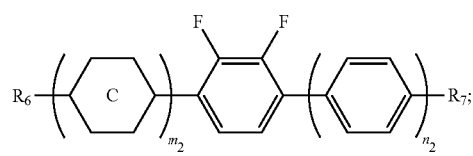

V wherein in Formula V, $R_6$ and $R_7$ each independently represent an alkyl with a carbon atom number of 1-10, an alkoxy with a carbon atom number of 1-10 or an alkenyl with a carbon atom number of 2-10;

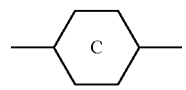

represents

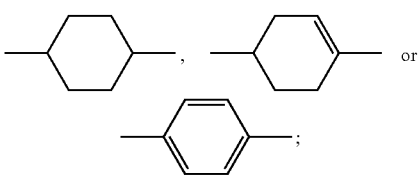

and $m_2$ represents 1 or 2, and $n_2$ represents 0 or 1.

In the above-mentioned liquid crystal composition, in percentage by mass, the content of the compound represented by Formula V is 1-50%, preferably 1-40%, further preferably 1-35%, still further preferably 5-35%.

Preferably, the above-mentioned liquid crystal composition comprises at least two compounds represented by Formula V.

Preferably, the above-mentioned compound represented by Formula V is selected from the group consisting of compounds represented by Formulas V-1 to V-8:

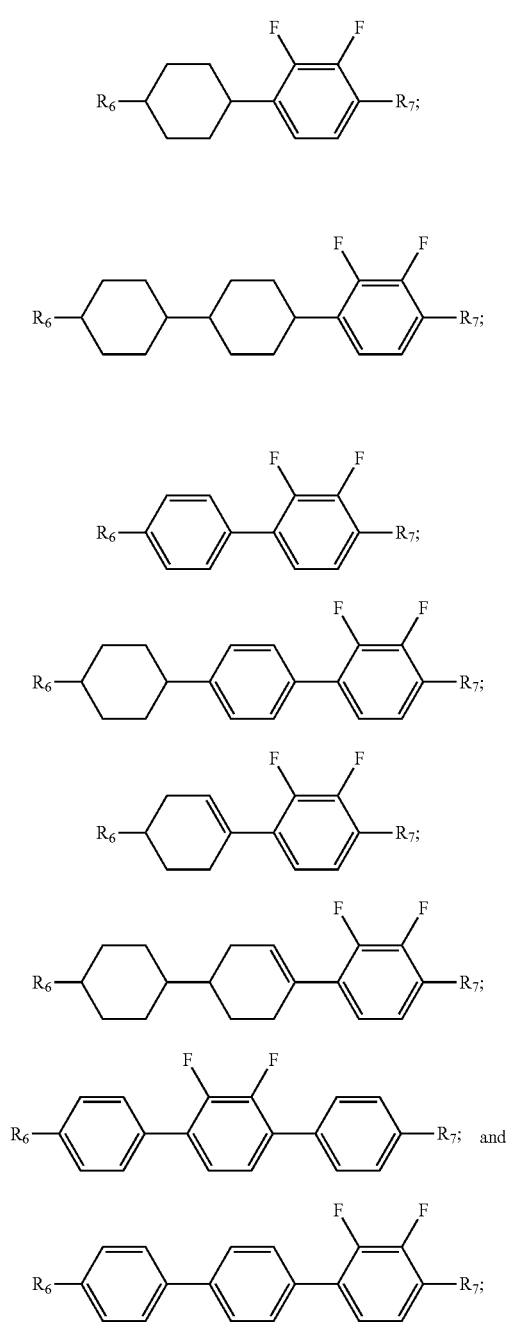

wherein R₆ represents an alkyl with a carbon atom number of 1-5, and R₇ represents an alkoxy with a carbon atom number of 1-5.

Further preferably, the above-mentioned compound represented by Formula V is selected from the group consisting of compounds represented by Formulas V-1-1 to V-4-6:

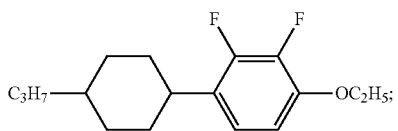

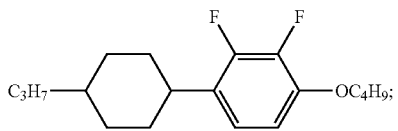

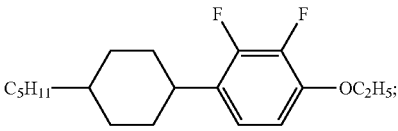

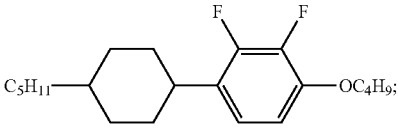

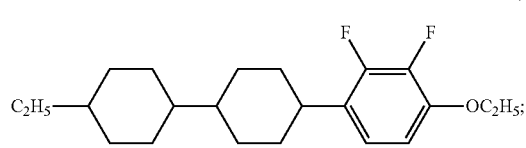

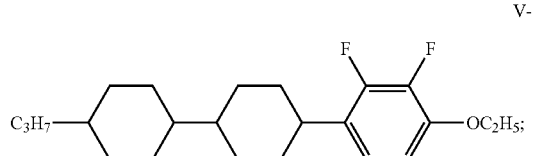

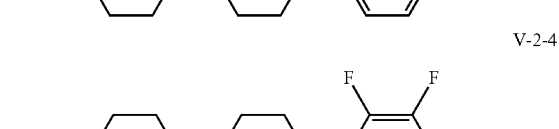

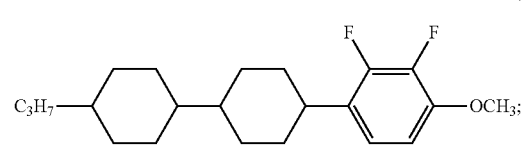

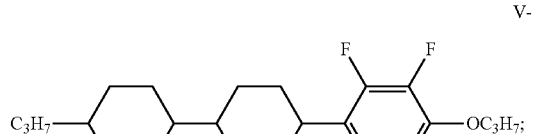

-continued

V-2-7
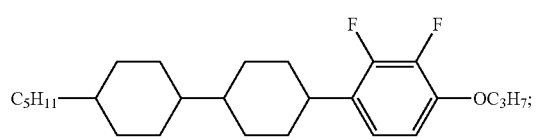

V-4-1
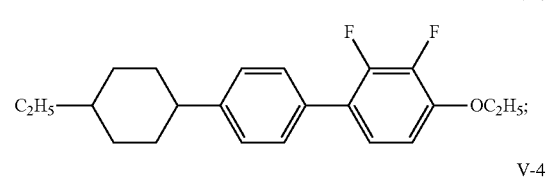

V-4-2
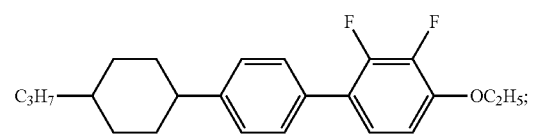

V-4-3
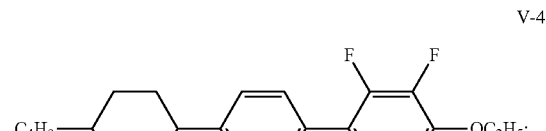

V-4-4
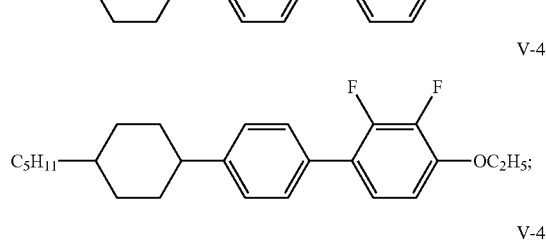

V-4-5
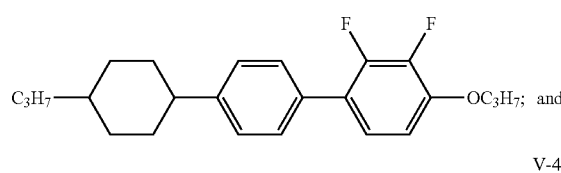

V-4-6
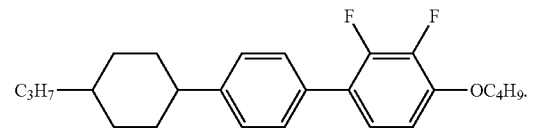

The liquid crystal composition of the present invention preferably further comprises one or more compounds represented by Formula VI:

VI
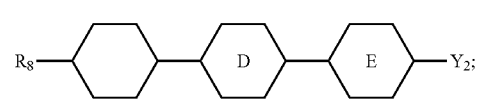

wherein in Formula VI, $R_8$ represents an alkyl with a carbon atom number of 1-10 or an alkenyl with a carbon atom number of 2-10, and $Y_2$ represents F or $OCF_3$;

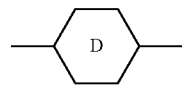

represents

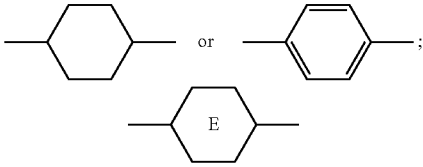

represents

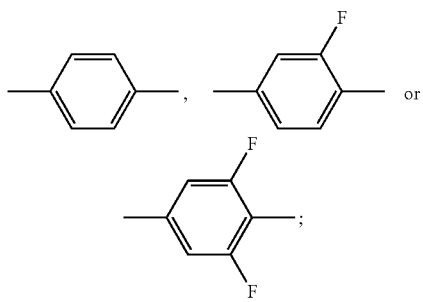

and when

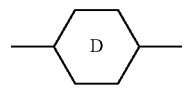

represents

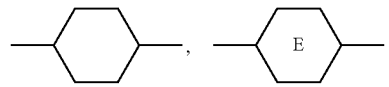

represents

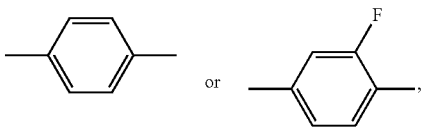

and when

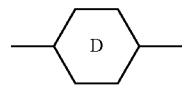

represents—

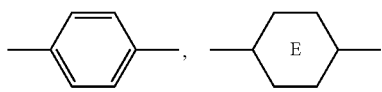

represents

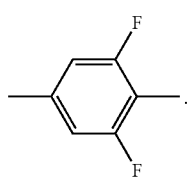

In the above-mentioned liquid crystal composition, in percentage by mass, the content of the compound represented by Formula VI is 1-20%, preferably 1-18%, further preferably 4-15%.

Preferably, the above-mentioned liquid crystal composition comprises at least two compounds represented by Formula VI.

Preferably, the above-mentioned compound represented by Formula VI is selected from the group consisting of compounds represented by Formulas VI-1 to VI-4:

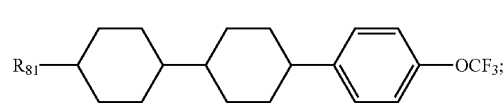
VI-1

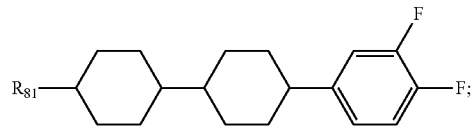
VI-2

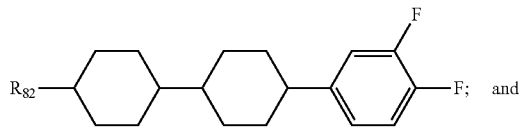
VI-3

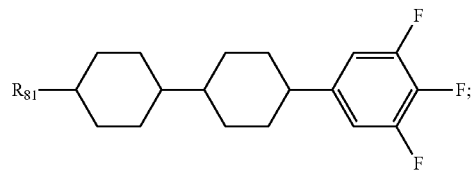
VI-4 wherein $R_{81}$ represents an alkyl with a carbon atom number of 1-5, and $R_{82}$ represents an alkenyl with a carbon atom number of 2-5.

Further preferably, the above-mentioned compound represented by Formula VI is selected from the group consisting of compounds represented by Formulas VI-1-1 to VI-4-4:

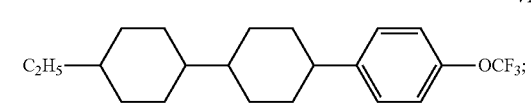
VI-1-1

VI-1-2

VI-1-3

VI-1-4

VI-2-1

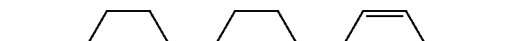
VI-2-2

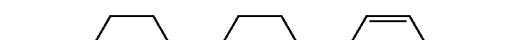
VI-2-3

VI-2-4

VI-3-1

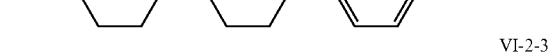
VI-3-2

VI-4-1

VI-4-2

-continued

VI-4-3

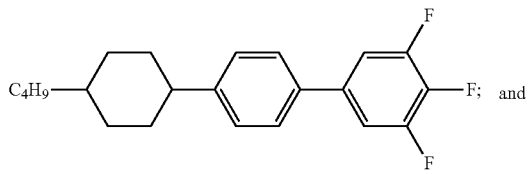

VI-4-4

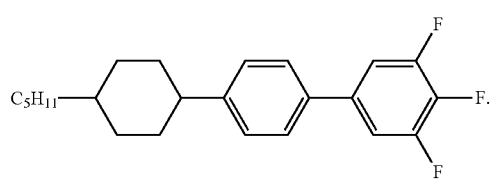

The liquid crystal composition of the present invention preferably further comprises one or more compounds represented by Formula VII:

VII

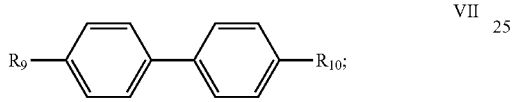

wherein in Formula VII, $R_9$ and $R_{10}$ each independently represent an alkyl with a carbon atom number of 1-10 or an alkenyl with a carbon atom number of 2-10.

In the above-mentioned liquid crystal composition, in percentage by mass, the content of the compound represented by Formula VII is 1-30%, further preferably 1-20%, further preferably 1-10%.

Preferably, the above-mentioned compound represented by Formula VII is selected from the group consisting of compounds represented by Formulas VII-1 to VII-5:

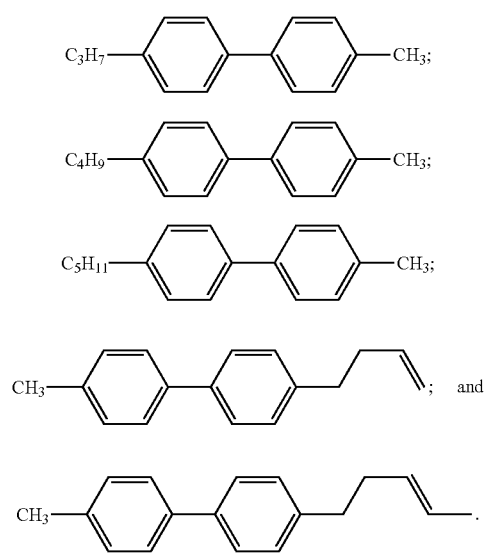

The liquid crystal composition of the present invention preferably further comprises one or more compounds represented by Formula VIII:

VIII

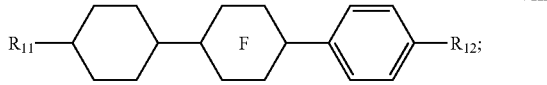

wherein in Formula VIII, $R_{11}$ and $R_{12}$ each independently represent an alkyl with a carbon atom number of 1-10 or an alkenyl with a carbon atom number of 2-10, and at least one of $R_{11}$ and $R_{12}$ represents alkenyl.

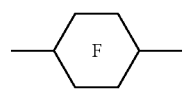

represents

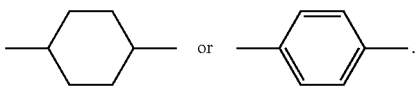

In the above-mentioned liquid crystal composition, in percentage by mass, the content of the compound represented by Formula VIII is 1-40%, preferably 1-30%, further preferably 1-20%.

Preferably, the above-mentioned compound represented by Formula VIII is selected from the group consisting of compounds represented by Formulas VIII-1 to VIII-11:

VIII-1

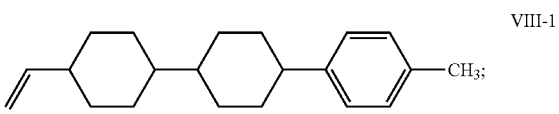

VIII-2

VIII-3

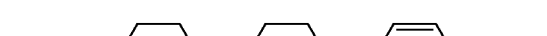

VIII-4

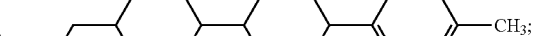

VIII-5

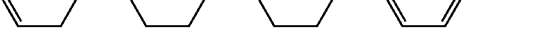

VIII-6

-continued

VIII-7
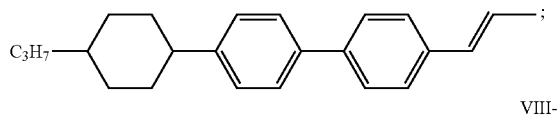

VIII-8
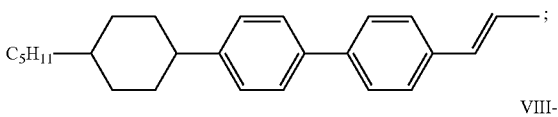

VIII-9
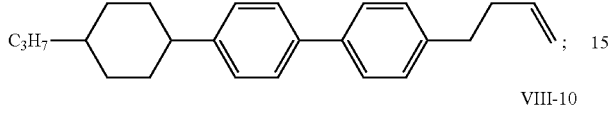

VIII-10
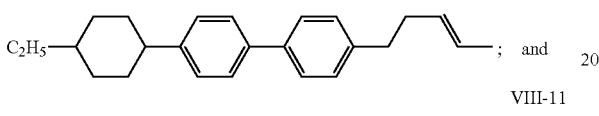; and

VIII-11
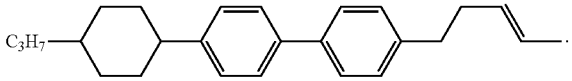.

The liquid crystal composition of the present invention preferably further comprises one or more compounds represented by Formula IX:

IX
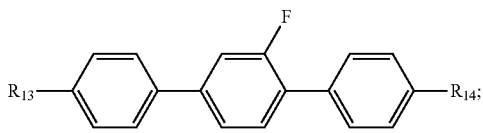

wherein in Formula IX, $R_{13}$ and $R_{14}$ each independently represent an alkyl with a carbon atom number of 1-10 or an alkenyl with a carbon atom number of 2-10, and at least one of $R_{13}$ and $R_{14}$ represents alkenyl.

In the above-mentioned liquid crystal composition, in percentage by mass, the content of the compound represented by Formula IX is 1-40%, preferably 1-30%, further preferably 1-15%.

Preferably, the above-mentioned compound represented by Formula IX is selected from the group consisting of compounds represented by Formulas IX-1 to IX-9:

IX-1
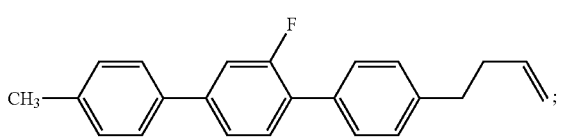

IX-2
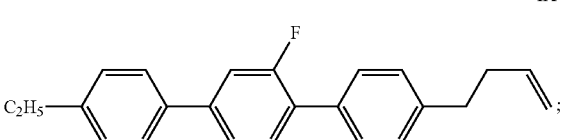

-continued

IX-3
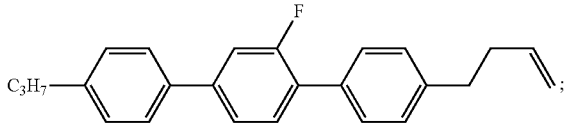

IX-4
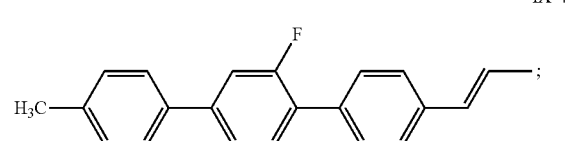

IX-5
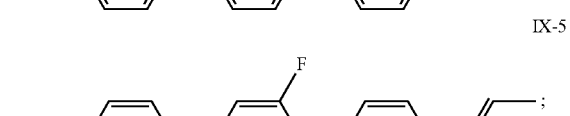

IX-6
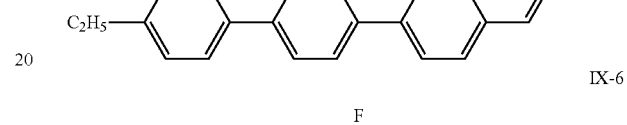

IX-7
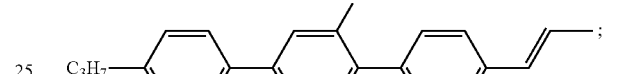

IX-8
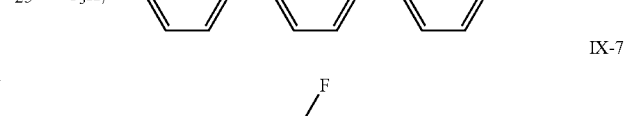; and

IX-9
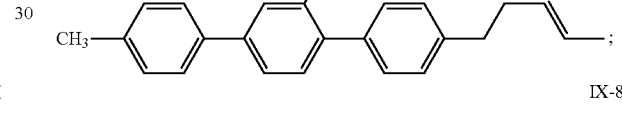.

The liquid crystal composition of the present invention preferably further comprises one or more compounds represented by Formula X:

X
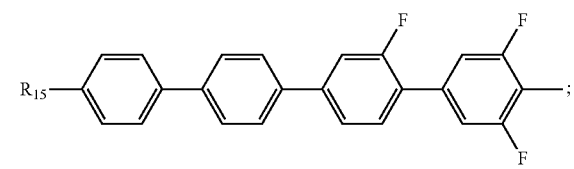

wherein in Formula X, $R_{15}$ represents an alkyl with a carbon atom number of 1-10, and any one or more noncontiguous —$CH_2$— in the group represented by $R_{15}$ is optionally replaced by cyclopentylene, cyclobutylene or cyclopropylene.

In the above-mentioned liquid crystal composition, in percentage by mass, the content of the compound represented by Formula X is 0.1-2%, preferably 0.1-1%.

Preferably, the above-mentioned compound represented by Formula X is selected from the group consisting of compounds represented by Formulas X-1 to X-5:

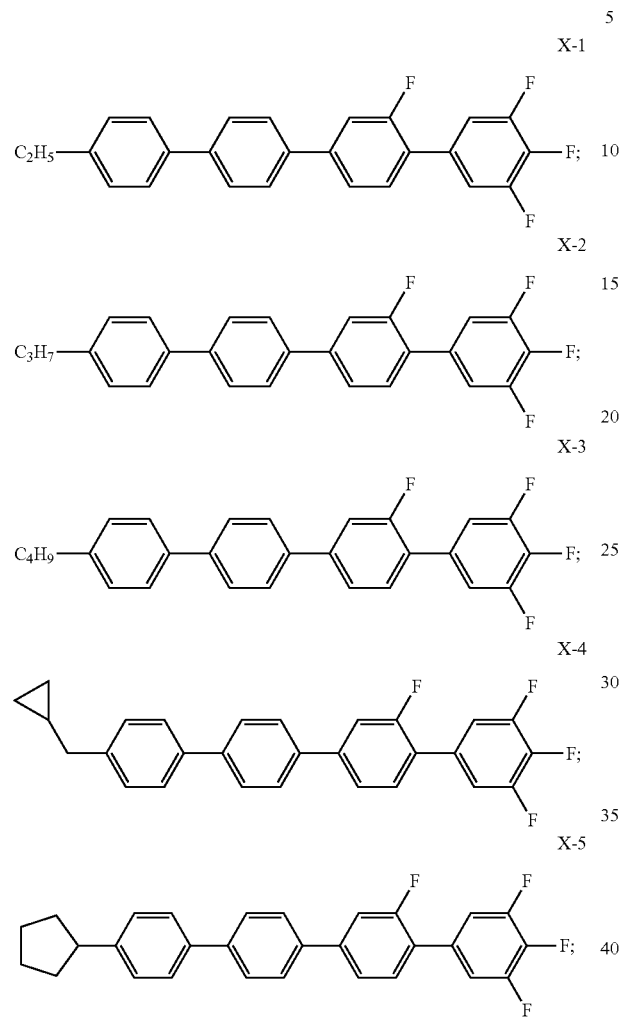

The liquid crystal composition of the present invention preferably further comprises one or more compounds represented by Formula XI:

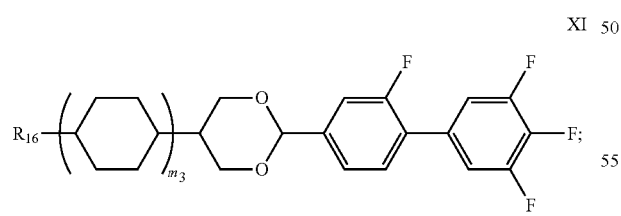

wherein in Formula XI, $R_{16}$ represents an alkyl with a carbon atom number of 1-10, and $m_3$ represents 0 or 1.

In the above-mentioned liquid crystal composition, in percentage by mass, the content of the compound represented by Formula XI is 1-20%, preferably 1-15%, further preferably 1-10%.

Preferably, the above-mentioned compound represented by Formula XI is selected from the group consisting of compounds represented by Formulas XI-1 to XI-8:

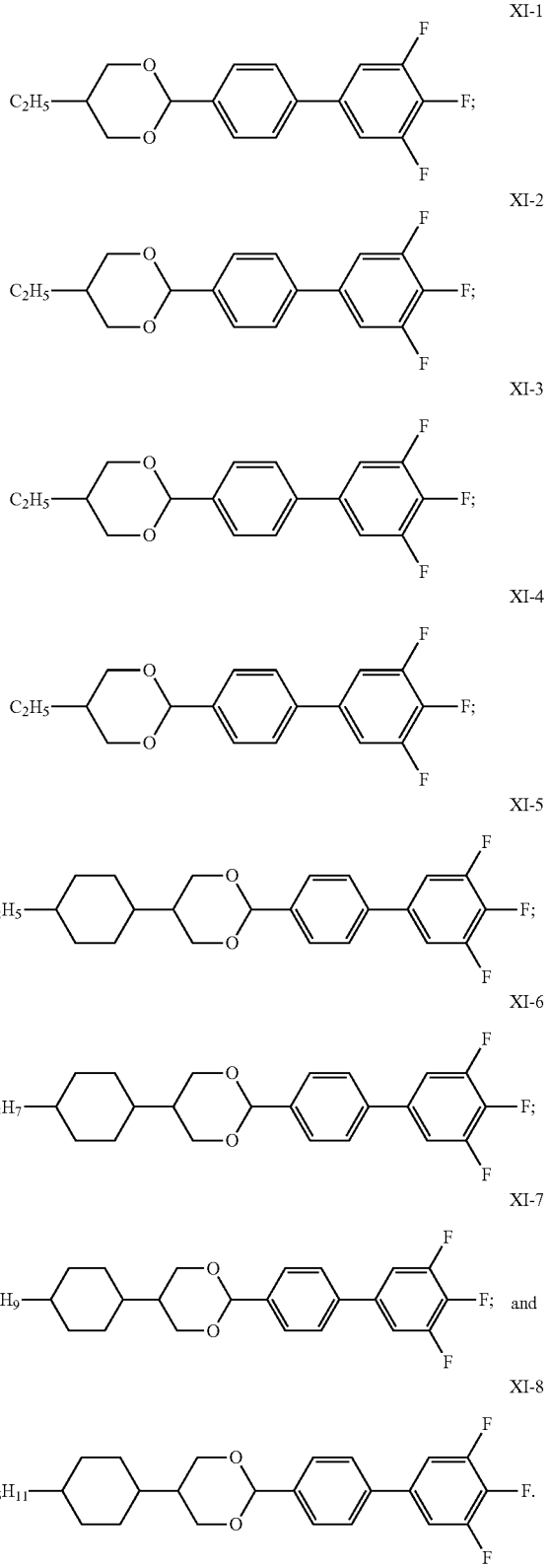

The above-mentioned alkyl with a carbon atom number of 1-10 may include, by way of example, methyl, ethyl, n-propyl, isopropyl, n-butyl, isobutyl, tert-butyl, n-pentyl, isopentyl, hexyl, heptyl, octyl, nonyl, decyl, etc.

The above-mentioned alkoxy with a carbon atom number of 1-10 may include, by way of example, methoxy, ethoxy, n-propoxy, isopropoxy, n-butoxy, isobutoxy, pentoxy, hexyloxy, heptyloxy, octyloxy, nonoxy, decyloxy, etc.

The above-mentioned alkenyl with a carbon atom number of 2-10 may include, by way of example, vinyl, 1-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, etc.

The group obtained by substituting one or more nonadjacent —CH$_2$— in the above-mentioned alkyl with a carbon atom number of 1-10 with cyclopropylene, cyclobutylene or cyclopentylene may include, by way of example, cyclopropyl, cyclobutyl, cyclopentyl, methylcyclopropylene, ethylcyclopropylene, propylcyclopropylene, isopropylcyclopropylene, n-butylcyclopropylene, isobutylcyclopropylene, tert-butylcyclopropylene, methylcyclobutylene, ethylcyclobutylene, propylcyclobutylene, isopropylcyclobutylene, n-butylcyclobutylene, isobutylcyclobutylene, tert-butylcyclobutylene, methylcyclopentylene, ethylcyclopentylene, propylcyclopentylene, isopropylcyclopentylene, n-butylcyclopentylene, isobutylcyclopentylene, etc.

The liquid crystal composition provided by the present invention suitable for TV displays has a dielectric anisotropy Δε of 2.0-5.0, preferably 2.0-3.5, a clearing point Cp of 75-90° C., and an anisotropy Δn of 0.095-0.130, preferably 0.100-0.125.

A variety of functional dopants may also be added to the liquid crystal compound of the present invention, and the content of the dopant is preferably between 0.01% and 1%. The dopants may include, by way of example, an antioxidant, an ultraviolet absorber and a chiral agent.

The antioxidant may include, by way of example,

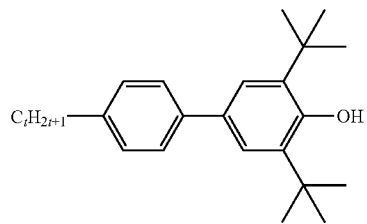

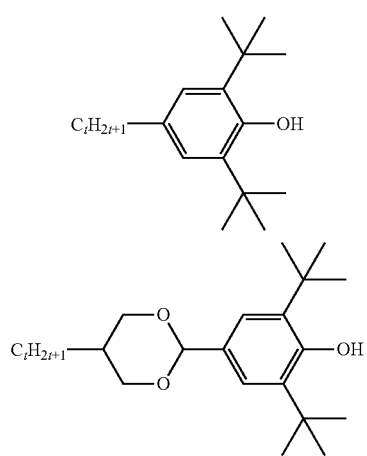

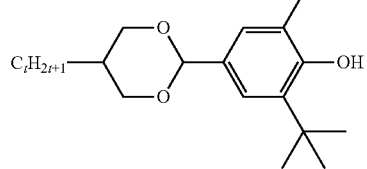

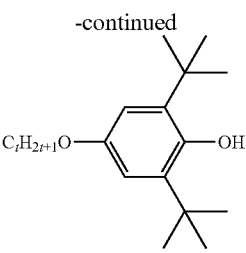

wherein t represents an integer from 1 to 10.

The ultraviolet absorber may include, by way of example,

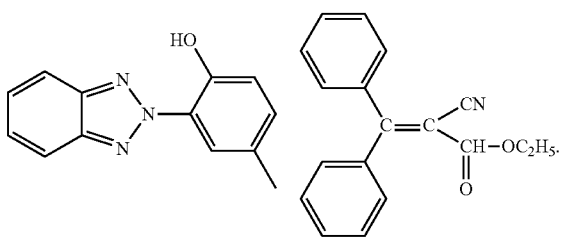

The chiral agent (levorotatory or dextrorotatory) may preferably include, by way of example,

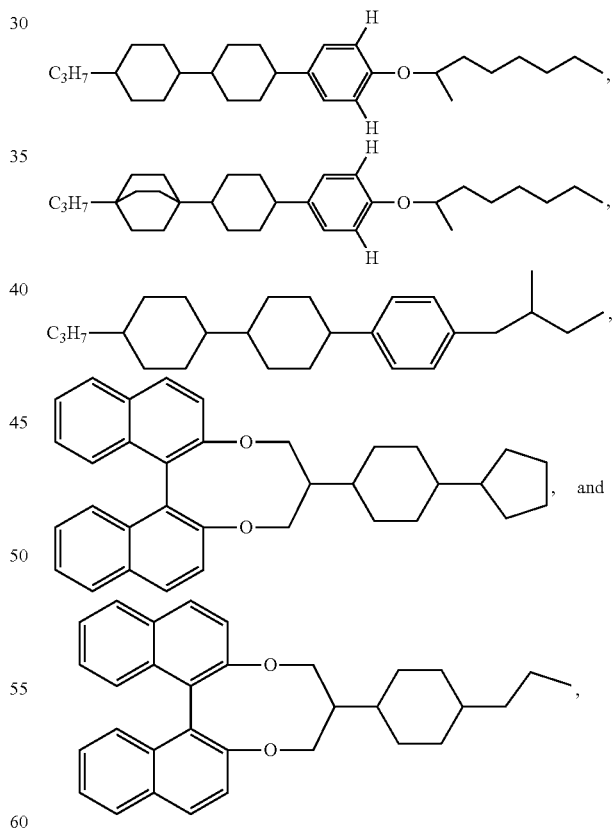

[Liquid Crystal Display Element or Liquid Crystal Display]

To achieve another object above, the present invention provides the following technical solution:

A liquid crystal display element or liquid crystal display, wherein the liquid crystal display element or liquid crystal display comprises the liquid crystal composition of the present invention, and the liquid crystal display element or liquid crystal display is an active matrix display element or display.

Furthermore, the liquid crystal display element or liquid crystal display is a liquid crystal display element or liquid crystal display with mini LED as backlight.

Furthermore, the liquid crystal display element or liquid crystal display is used in the field of TV display.

The display mode of the active matrix display element or display may specifically include, by way of example, TN-TFT, IPS-TFT, and FFS-TFT, and also include other TFT display modes.

The TV display containing the liquid crystal composition of the present invention has a high brightness, a low energy consumption, and no residual image defects after long-time backlight irradiation, and is very suitable for preparing 65-100 inch TV displays with 4K and 8K resolutions and mini LED backlight.

As long as the liquid crystal display element or liquid crystal display of the present invention contains the liquid crystal composition of the present invention, there are no restrictions on the structure thereof, and those skilled in the art can choose an appropriate structure for the liquid crystal display element or liquid crystal display according to the required performance.

EXAMPLES

In order to explain the present invention more clearly, the present invention will be further explained below in conjunction with examples. A person skilled in the art should understand that the following detailed description is illustrative rather than restrictive, and should not limit the scope of protection of the present invention.

In the description, unless otherwise specified, the percentages all refer to mass percentages, the temperatures are degrees Celsius (° C.), and the specific meanings and test conditions of the other symbols are as follows:
  Cp represents the clearing point (° C.) of a liquid crystal, as measured by DSC quantitative method;
  $\Delta n$ represents optical anisotropy, with $\Delta n = n_e - n_o$, wherein $n_o$ is the refractive index of ordinary light and $n_e$ is the refractive index of extraordinary light, and the test conditions are 25° C.±2° C., 589 nm, and Abbe refractometer test;
  $\Delta\varepsilon$ represents dielectric anisotropy, $\Delta\varepsilon = \varepsilon_{//} - \varepsilon_\perp$, wherein $\varepsilon_{//}$ is the dielectric constant parallel to the molecular axis, and $\varepsilon_\perp$ is the dielectric constant perpendicular to the molecular axis, and the test conditions are 25° C.±0.5° C., 20 μm antiparallel cell, and INSTEC:ALCT-CUST-4C test;
  $K_{11}$ is splay elastic constant, and the test conditions are: 25±2° C., INSTEC: ALCT-CUST-4C, and 20 μm parallel cell;
  $\gamma_1$ represents rotational viscosity (mPa·s), and the test conditions are 25° C.±0.5° C., 20 μm antiparallel cel, and IINSTEC: ALCT-CUST-4C test; and
  VHR represents voltage retention rate (%), and the test conditions are 60° C.±2° C., voltage±5 V, pulse width 10 ms, and voltage retention time 16.7 ms. The test equipment is TOYO Model 6254 LCD performance comprehensive tester.
  Residual image: With regard to the residual image of the liquid crystal display device, after a specified fixed pattern is displayed in the display area for 1000 hours, the residual level of the fixed pattern during uniform display of full image is subjected to the following 4-level evaluation by visual inspection:
  ⊚ having no residue;
  ○ having a very small amount of residue, which is at an acceptable level;
  Δ having residue, which is at an unacceptable level; and
  × having residue, which is quite poor.

The preparation method for the liquid crystal composition involves: weighing various liquid crystal monomers at a certain ratio and putting the liquid crystal monomers into a stainless steel beaker, placing the stainless steel beaker containing these liquid crystal monomers on a magnetic stirring instrument for heating and melting, adding a magnetic rotor to the stainless steel beaker when most of the liquid crystal monomers in the stainless steel beaker have melted, uniformly stirring the mixture, and cooling the mixture to room temperature to obtain the liquid crystal composition.

The structures of the liquid crystal monomers in the examples of the present invention are represented by codes, and the code representation method for liquid crystal ring structures, terminal groups and linker groups is shown in Tables 1 and 2 below.

TABLE 1

Corresponding codes of ring structures

| Ring structure | Corresponding code |
|---|---|
|  | C |
|  | P |
|  | L |
| 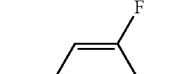 | G |
| 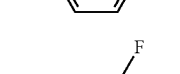 | U |
| 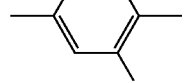 | K |
| 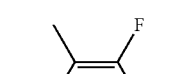 | Y |

TABLE 1-continued

Corresponding codes of ring structures

| Ring structure | Corresponding code |
|---|---|
| (tetrahydropyran) | A |
| (1,3-dioxane) | D |
| (chromane) | Sa |
| (dibenzothiophene) | Sc |

TABLE 2

Corresponding codes of terminal groups and linker groups

| Terminal groups and linker groups | Corresponding code |
|---|---|
| $C_nH_{2n+1}$- | n- |
| —$C_nH_{2n}$— | -n- |
| $C_nH_{2n+1}O$— | nO— |
| —$C_nH_{2n}O$— | -nO— |
| —$CF_3$ | -T |
| —$OCF_3$ | —OT |
| —$CH_2O$— | —O— |
| —$CF_2O$— | -Q- |
| —F | —F |
| —CH=CH— | —V— |
| —CH=$CH_2$ | —V |
| (cyclopentyl) | Cp- |
| (cyclopropyl) | Cpr- |
| (cyclopropylmethyl) | Cpr1- |

For example:

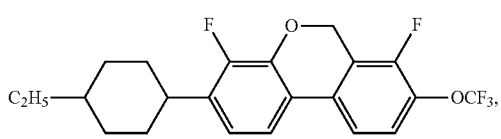 [SMILES: CCC1CCC(c2ccc3c(c2F)OCc2c-3ccc(OC(F)(F)F)c2F)CC1]

the code of which is LSa-2-OT;

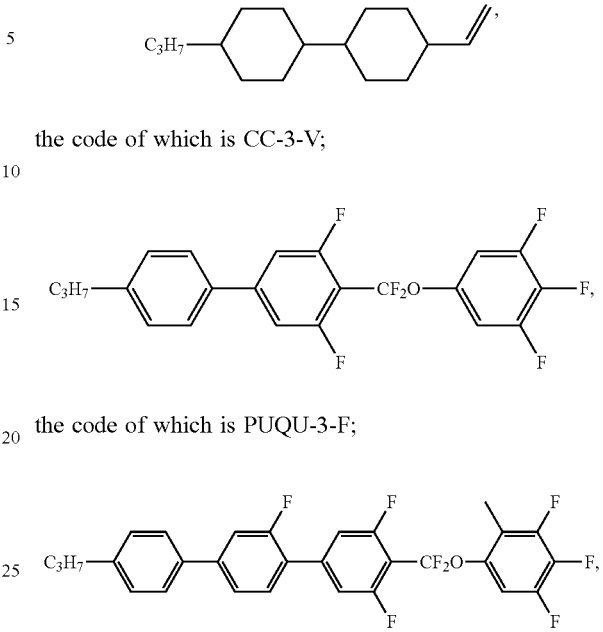

the code of which is CC-3-V;

the code of which is PUQU-3-F;

the code of which is PGUQK-3-F;

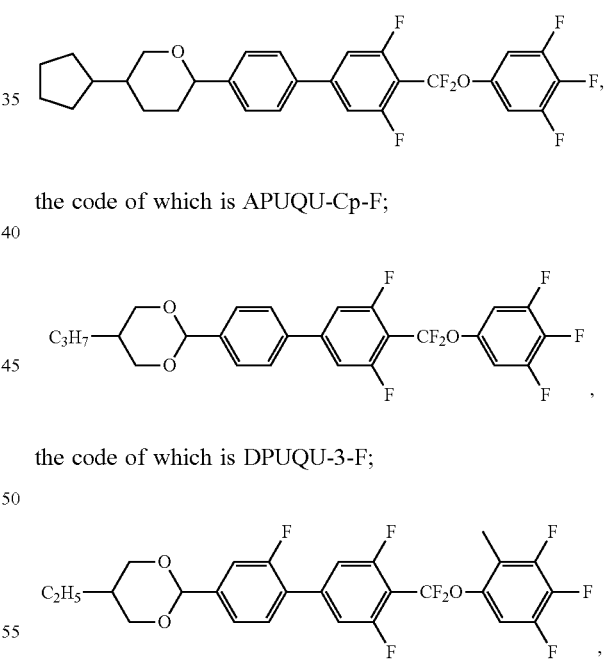

the code of which is APUQU-Cp-F;

the code of which is DPUQU-3-F;

the code of which is DGUQK-2-F;

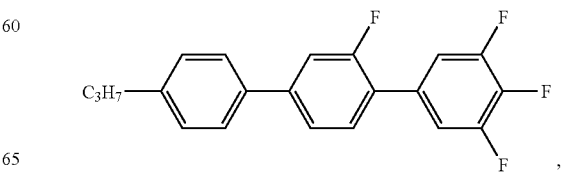

the code of which is PGU-3-F;

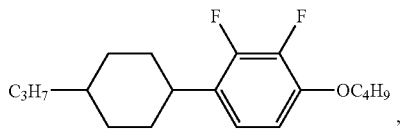

the code of which is CY-3-O4;

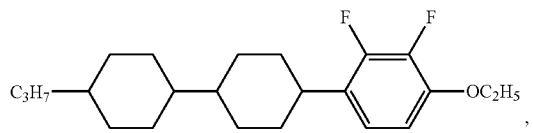

the code of which is CCY-3-O2;

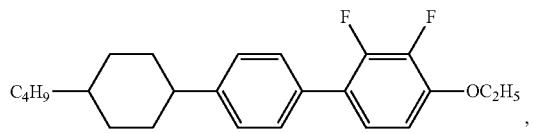

the code of which is CPY-4-O2;

the code of which is CCP-3-OT;

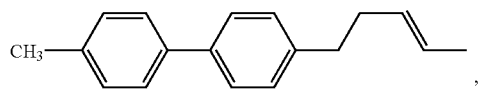 [SMILES: C/C=C/CCc1ccc(-c2ccc(C)cc2)cc1]

the code of which is PP-1-2V1;

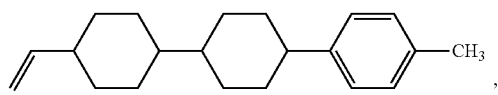 [SMILES: C=CC1CCC(C2CCC(c3ccc(C)cc3)CC2)CC1]

the code of which is CCP-V-1;

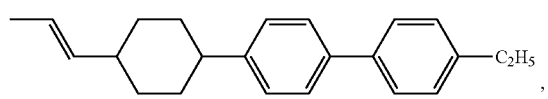 [SMILES: C/C=C/C1CCC(c2ccc(-c3ccc(CC)cc3)cc2)CC1]

the code of which is CPP-1V-2;

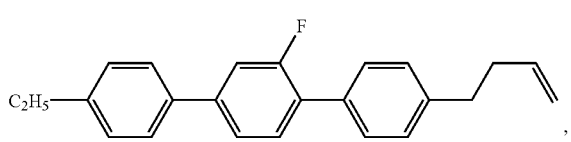 [SMILES: C=CCCc1ccc(-c2ccc(-c3ccc(CC)cc3)cc2F)cc1]

the code of which is PGP-2-2V;

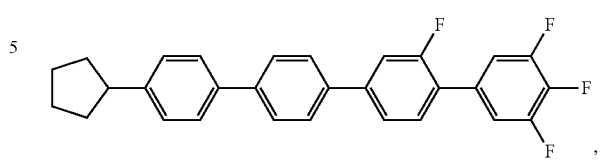

the code of which is PPGU-Cp-F;

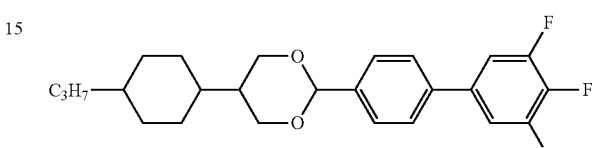

the code of which is CDPU-3-F;

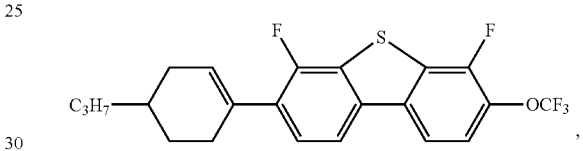

the code of which is LSc-3-OT; and

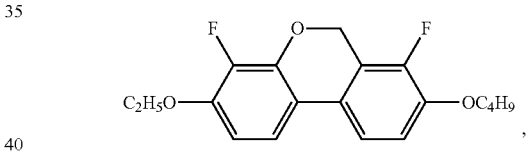

the code of which is Sa-2O-O4.

Example 1

The formula and corresponding properties of the liquid crystal compositions were as shown in Table 3 below.

TABLE 3

| Formula and corresponding properties of the liquid crystal composition of Example 1 | | |
|---|---|---|
| Class | Code of liquid crystal monomer | Content (in parts by mass) |
| II | CC-3-V | 43 |
| II | CC-3-V1 | 5 |
| VIII | CCP-V-1 | 10 |
| V | CPY-3-O2 | 6 |
| V | CPY-2-O2 | 6 |
| III | PGUQU-3-F | 5 |
| III | PGUQU-4-F | 5 |
| XI | DPU-3-F | 5 |
| XI | CDPU-4-F | 1 |

TABLE 3-continued

Formula and corresponding properties of the
liquid crystal composition of Example 1

| Class | Code of liquid crystal monomer | Content (in parts by mass) |
|---|---|---|
| I | LSa-3-OT | 13 |
| X | PPGU-W-F | 1 |

$\Delta\varepsilon$ [1 KHz, 25° C.]: 2.87
$\varepsilon_\perp$ [1 KHz, 25° C.]: 4.70
$\Delta n$ [589 nm, 25° C.]: 0.111
Cp: 90.0° C.
$\gamma_1$: 72.4 mPa · s
$K_{11}$: 15.2
$\gamma_1/K_{11}$: 4.76
$\varepsilon_\perp/\Delta\varepsilon$: 1.64

Example 2

The formula and corresponding properties of the liquid crystal compositions were as shown in Table 4 below.

TABLE 4

Formula and corresponding properties of the
liquid crystal composition of Example 2

| Class | Code of liquid crystal monomer | Content (in parts by mass) |
|---|---|---|
| II | CC-3-V | 42 |
| II | CC-3-V1 | 10 |
| VIII | CCP-V-1 | 5 |
| V | CPY-3-O2 | 7 |
| V | CPY-2-O2 | 6 |
| III | PGUQK-3-F | 6 |
| XI | DPU-3-F | 5 |
| I | LSa-3-OT | 15 |
| III | DPUQU-4-F | 4 |

$\Delta\varepsilon$ [1 KHz, 25° C.]: 2.42
$\varepsilon_\perp$ [1 KHz, 25° C.]: 4.90
$\Delta n$ [589 nm, 25° C.]: 0.109
Cp: 87.5° C.
$\gamma_1$: 69.6 mPa · s
$K_{11}$: 15.7
$\gamma_1/K_{11}$: 4.45
$\varepsilon_\perp/\Delta\varepsilon$: 2.02

Example 3

The formula and corresponding properties of the liquid crystal compositions were as shown in Table 5 below.

TABLE 5

Formula and corresponding properties of the
liquid crystal composition of Example 3

| Class | Code of liquid crystal monomer | Content (in parts by mass) |
|---|---|---|
| II | CC-3-V | 50 |
| II | CC-3-V1 | 10 |
| V | CPY-3-O2 | 6 |
| V | CPY-2-O2 | 6 |
| XI | DPU-3-F | 5 |
| I | LSa-3-OT | 9 |
| X | PPGU-W-F | 1 |
| III | DPUQU-4-F | 3 |
| III | DGUQU-3-F | 3 |

TABLE 5-continued

Formula and corresponding properties of the
liquid crystal composition of Example 3

| Class | Code of liquid crystal monomer | Content (in parts by mass) |
|---|---|---|
| III | DGUQU-4-F | 2 |
| IX | PGP-2-2V | 5 |

$\Delta\varepsilon$ [1 KHz, 25° C.]: 2.89
$\varepsilon_\perp$ [1 KHz, 25° C.]: 4.50
$\Delta n$ [589 nm, 25° C.]: 0.101
Cp: 78.1° C.
$\gamma_1$: 54.3 mPa · s
$K_{11}$: 13.9
$\gamma_1/K_{11}$: 3.90
$\varepsilon_\perp/\Delta\varepsilon$: 1.78

Example 4

The formula and corresponding properties of the liquid crystal compositions were as shown in Table 6 below.

TABLE 6

Formula and corresponding properties of the liquid
crystal composition of Example 4

| Class | Code of liquid crystal monomer | Content (in parts by mass) |
|---|---|---|
| II | CC-3-V | 44 |
| VIII | CCP-V-1 | 10 |
| V | CPY-3-O2 | 6 |
| XI | CDPU-3-F | 5 |
| I | LSa-3-OT | 10 |
| III | DGUQU-3-F | 3.5 |
| IX | PGP-2-2V | 5.5 |
| V | CY-3-O2 | 6 |
| IV | PGU-3-F | 10 |

$\Delta\varepsilon$ [1 KHz, 25° C.]: 2.89
$\varepsilon_\perp$ [1 KHz, 25° C.]: 4.76
$\Delta n$ [589 nm, 25° C.]: 0.113
Cp: 75.9° C.
$\gamma_1$: 56.2 mPa · s
$K_{11}$: 13.2
$\gamma_1/K_{11}$: 4.25
$\varepsilon_\perp/\Delta\varepsilon$: 1.65

Example 5

The formula and corresponding properties of the liquid crystal compositions were as shown in Table 7 below.

TABLE 7

Formula and corresponding properties of the
liquid crystal composition of Example 5

| Class | Code of liquid crystal monomer | Content (in parts by mass) |
|---|---|---|
| II | CC-3-V | 40 |
| VIII | CCP-V-1 | 10 |
| V | CPY-3-O2 | 5 |
| XI | DPU-3-F | 5 |
| I | LSa-3-OT | 10 |
| X | PPGU-3-F | 1 |
| V | CY-3-O2 | 5 |
| IV | PGU-3-F | 5 |
| III | PUQU-3-F | 10 |

TABLE 7-continued

Formula and corresponding properties of the
liquid crystal composition of Example 5

| Class | Code of liquid crystal monomer | Content (in parts by mass) |
|---|---|---|
| V | CCY-3-O2 | 5 |
| VIII | CCP-V2-1 | 4 |

$\Delta\varepsilon$ [1 KHz, 25° C.]: 3.1
$\varepsilon_\perp$ [1 KHz, 25° C.]: 5.03
$\Delta n$ [589 nm, 25° C.]: 0.104
Cp: 75.6° C.
$\gamma_1$: 63.3 mPa · s
$K_{11}$: 13.1
$\gamma_1/K_{11}$: 4.84
$\varepsilon_\perp/\Delta\varepsilon$: 1.62

Example 6

The formula and corresponding properties of the liquid crystal compositions were as shown in Table 8 below.

TABLE 8

Formula and corresponding properties of the
liquid crystal composition of Example 6

| Class | Code of liquid crystal monomer | Content (in parts by mass) |
|---|---|---|
| II | CC-3-V | 49 |
| VIII | CCP-V-1 | 10 |
| V | CPY-3-O2 | 5 |
| I | LSa-3-OT | 15 |
| X | PPGU-W-F | 1 |
| IV | PGU-3-F | 5 |
| V | CCY-3-O2 | 5 |
| III | APUQK-3-F | 5 |
| III | PGUQK-3-F | 5 |

$\Delta\varepsilon$ [1 KHz, 25° C.]: 2.24
$\varepsilon_\perp$ [1 KHz, 25° C.]: 4.67
$\Delta n$ [589 nm, 25° C.]: 0.105
Cp: 88.7° C.
$\gamma_1$: 64.8 mPa · s
$K_{11}$: 15.3
$\gamma_1/K_{11}$: 4.22
$\varepsilon_\perp/\Delta\varepsilon$: 2.08

Example 7

The formula and corresponding properties of the liquid crystal compositions were as shown in Table 9 below.

TABLE 9

Formula and corresponding properties of the
liquid crystal composition of Example 7

| Class | Code of liquid crystal monomer | Content (in parts by mass) |
|---|---|---|
| II | CC-3-V | 49 |
| IX | PGP-2-2V | 10.5 |
| I | LSa-3-OT | 15 |
| IV | PGU-3-F | 5 |
| V | CCY-3-O2 | 10 |
| III | APUQU-3-F | 3.5 |

TABLE 9-continued

Formula and corresponding properties of the
liquid crystal composition of Example 7

| Class | Code of liquid crystal monomer | Content (in parts by mass) |
|---|---|---|
| III | APUQK-3-F | 3 |
| III | PGUQU-3-F | 4 |

$\Delta\varepsilon$ [1 KHz, 25° C.]: 2.3
$\varepsilon_\perp$ [1 KHz, 25° C.]: 4.79
$\Delta n$ [589 nm, 25° C.]: 0.118
Cp: 87.3° C.
$\gamma_1$: 63.1 mPa · s
$K_{11}$: 15.6
$\gamma_1/K_{11}$: 4.05
$\varepsilon_\perp/\Delta\varepsilon$: 2.08

Example 8

The formula and corresponding properties of the liquid crystal compositions were as shown in Table 10 below.

TABLE 10

Formula and corresponding properties of the
liquid crystal composition of Example 8

| Class | Code of liquid crystal monomer | Content (in parts by mass) |
|---|---|---|
| II | CC-3-V | 40 |
| IX | PGP-2-2V | 10 |
| I | LSa-3-OT | 10 |
| X | PPGU-3-F | 1 |
| V | CY-3-O2 | 10 |
| III | APUQU-3-F | 10 |
| III | PGUQU-3-F | 5 |
| VIII | CCP-V-1 | 10 |
| V | PY-3-O2 | 4 |

$\Delta\varepsilon$ [1 KHz, 25° C.]: 2.77
$\varepsilon_\perp$ [1 KHz, 25° C.]: 5.03
$\Delta n$ [589 nm, 25° C.]: 0.116
Cp: 77.1° C.
$\gamma_1$: 54.7 mPa · s
$K_{11}$: 12.7
$\gamma_1/K_{11}$: 4.32
$\varepsilon_\perp/\Delta\varepsilon$: 1.82

Example 9

The formula and corresponding properties of the liquid crystal compositions were as shown in Table 11 below.

TABLE 11

Formula and corresponding properties of the
liquid crystal composition of Example 9

| Class | Code of liquid crystal monomer | Content (in parts by mass) |
|---|---|---|
| II | CC-3-V | 35 |
| I | LSa-3-OT | 20 |
| X | PPGU-W-F | 1 |
| V | CY-3-O2 | 5 |
| III | PGUQU-3-F | 5 |
| VIII | CCP-V-1 | 20 |

TABLE 11-continued

Formula and corresponding properties of the
liquid crystal composition of Example 9

| Class | Code of liquid crystal monomer | Content (in parts by mass) |
|---|---|---|
| V | PY-3-O2 | 4 |
| III | PUQU-3-F | 10 |

Δε [1 KHz, 25° C.]: 2.66
$\varepsilon_\perp$ [1 KHz, 25° C.]: 5.12
Δn [589 nm, 25° C.]: 0.111
Cp: 78.2° C.
$\gamma_1$: 61.7 mPa · s
$K_{11}$: 13.5
$\gamma_1/K_{11}$: 4.56
$\varepsilon_\perp/\Delta\varepsilon$: 1.92

Example 10

The formula and corresponding properties of the liquid crystal compositions were as shown in Table 12 below.

TABLE 12

Formula and corresponding properties of the
liquid crystal composition of Example 10

| Class | Code of liquid crystal monomer | Content (in parts by mass) |
|---|---|---|
| II | CC-3-V | 44 |
| I | LSa-3-OT | 10 |
| X | PPGU-W-F | 1 |
| V | CY-3-O2 | 5 |
| III | PGUQU-3-F | 5 |
| VI | CCP-3-OT | 5 |
| VI | CCP-5-OT | 5 |
| VII | PP-1-2V1 | 5 |
| IX | PGP-1-2V | 10 |
| V | CPY-3-O2 | 5 |
| III | PGUQU-5-F | 5 |

Δε [1 KHz, 25° C.]: 2.58
$\varepsilon_\perp$ [1 KHz, 25° C.]: 4.40
Δn [589 nm, 25° C.]: 0.122
Cp: 81.3° C.
$\gamma_1$: 59.4 mPa · s
$K_{11}$: 14.7
$\gamma_1/K_{11}$: 4.04
$\varepsilon_\perp/\Delta\varepsilon$: 1.71

Example 11

The formula and corresponding properties of the liquid crystal compositions were as shown in Table 13 below.

TABLE 13

Formula and corresponding properties of the
liquid crystal composition of Example 11

| Class | Code of liquid crystal monomer | Content (in parts by mass) |
|---|---|---|
| II | CC-3-V | 44 |
| I | LSa-3-OT | 10 |
| VIII | CCP-V-1 | 2 |
| V | CY-3-O2 | 5 |
| III | PGUQK-3-F | 3 |
| III | APUQU-3-F | 3 |
| VI | CCP-3-OT | 8 |
| VI | CCG-V-F | 2 |
| VII | PP-1-2V1 | 5 |
| IX | PGP-1-2V | 10 |

TABLE 13-continued

Formula and corresponding properties of the
liquid crystal composition of Example 11

| Class | Code of liquid crystal monomer | Content (in parts by mass) |
|---|---|---|
| V | CPY-3-O2 | 5 |
| III | DPUQU-3-F | 3 |

Δε [1 KHz, 25° C.]: 2.23
$\varepsilon_\perp$ [1 KHz, 25° C.]: 4.44
Δn [589 nm, 25° C.]: 0.115
Cp: 81.1° C.
$\gamma_1$: 56.4 mPa · s
$K_{11}$: 14.5
$\gamma_1/K_{11}$: 3.89
$\varepsilon_\perp/\Delta\varepsilon$: 1.99

Comparative Example

The compound LSa-3-OT represented by Formula I in Example 11 was replaced by equal amounts of LSa-Cp1-OT, LSc-3-OT and Sa-2O-O4, respectively, to obtain liquid crystal compositions respectively as Comparative Examples 1, 2 and 3.

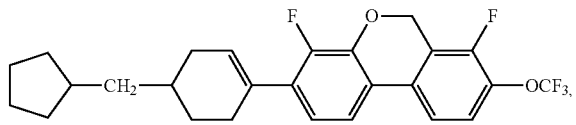 [SMILES: Fc1c(OC(F)(F)F)ccc2c1COc1c-2ccc(C2=CCC(CC3CCCC3)CC2)c1F]

the code of which was LSa-Cp1-OT;

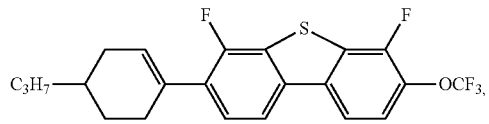

the code of which was LSc-3-OT; and

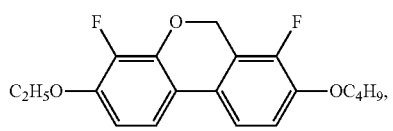

the code of which was Sa-2O-O4.

The compound CC-3-V represented by Formula II in Example 11 was replaced by an equal amount of CC-3-2 to obtain a liquid crystal composition as Comparative Example 4.

The compound represented by Formula III in Example 11 was replaced by an equal amount of CCUQU-3-F to obtain a liquid crystal composition as Comparative Example 5.

The compounds CY-3-O2 and CCY-3-O2 represented by Formula V in Example 11 were respectively replaced by equal amounts of COY-3-O2 and CCOY-3-O2 to obtain a liquid crystal composition as Comparative Example 6.

The compounds CCP-3-OT and CCG-V-F represented by Formula VI in Example 11 were respectively replaced by an equal amount of CCU-3-F to obtain a liquid crystal composition as Comparative Example 7.

Performance comparison between Example 11 and Comparative Examples 1-7 were as shown in Tables 14 and 15 below.

TABLE 14

Corresponding properties of Example 11 and Comparative Examples 1-3

| | Example 11 | Comparative Example 1 | Comparative Example 2 | Comparative Example 3 |
|---|---|---|---|---|
| $\Delta\varepsilon$ [1 KHz, 25° C.]: | 2.23 | 2.24 | 2.37 | 0.89 |
| $\varepsilon_\perp$ [1 KHz, 25° C.]: | 4.44 | 4.42 | 4.58 | 5.73 |
| $\Delta n$ [589 nm, 25° C.]: | 0.115 | 0.115 | 0.115 | 0.114 |
| Cp [° C.]: | 81.1 | 81.5 | 82.1 | 74.4 |
| $\gamma_1$ [mPa · s]: | 56.4 | 60.5 | 53.8 | 61.4 |
| $K_{11}$: | 14.5 | 14.7 | 14.6 | 13.2 |
| $\gamma_1/K_{11}$: | 3.89 | 4.12 | 3.68 | 4.65 |
| $\varepsilon_\perp/\Delta\varepsilon$: | 1.99 | 1.97 | 1.93 | 6.51 |

TABLE 15

Corresponding properties of Comparative Examples 4-7

| | Comparative Example 4 | Comparative Example 5 | Comparative Example 6 | Comparative Example 7 |
|---|---|---|---|---|
| $\Delta\varepsilon$ [1 KHz, 25° C.]: | 2.13 | 1.46 | 1.93 | 2.81 |
| $\varepsilon_\perp$ [1 KHz, 25° C.]: | 4.40 | 4.31 | 4.80 | 4.48 |
| $\Delta n$ [589 nm, 25° C.]: | 0.109 | 0.105 | 0.111 | 0.113 |
| Cp [° C.]: | 74.5 | 81.7 | 81.1 | 76.4 |
| $\gamma_1$ [mPa · s]: | 58.6 | 55.8 | 59.1 | 59.0 |
| $K_{11}$: | 14.7 | 14.4 | 14.6 | 13.2 |
| $\gamma_1/K_{11}$: | 3.99 | 3.88 | 4.04 | 4.47 |
| $\varepsilon_\perp/\Delta\varepsilon$: | 2.06 | 2.95 | 2.49 | 1.59 |

It could be seen from the above Table 14 that compared with Comparative Example 1, Example 11 had a smaller $\gamma_1/K_{11}$ and a faster response speed, although its clearing point was lower. Compared with Comparative Example 2, Example 11 had a higher $\varepsilon_\perp/\Delta\varepsilon$ and a higher transmittance, which was more conducive to improving the utilization rate of backlight, and could solve the problem of the low aperture ratio of a high-resolution panel leading to a low panel brightness. Compared with Comparative Example 3, Example 11 had a larger elastic constant $K_{11}$, a higher dielectric anisotropy, a higher clearing point and a smaller $\gamma_1/K_{11}$. Since Sa-2O-O4 had a larger negative dielectric anisotropy and a larger rotational viscosity, although it could provide a large vertical dielectricity, the dielectric anisotropy was too small, which required a large driving voltage for normal display, leading to an excessively high energy consumption.

It could be seen from the above Table 15 that compared with Comparative Example 4, Example 11 had a larger optical anisotropy $\Delta n$, a higher clearing point, a smaller $\gamma_1/K_{11}$, and a faster response speed. Compared with Comparative Example 5, Example 11 had an obviously larger optical anisotropy $\Delta n$, a larger dielectric anisotropy, a smaller driving voltage, and a lower energy consumption. Compared with Comparative Example 6, Example 11 had a larger optical anisotropy $\Delta n$, a larger dielectric anisotropy, a smaller $\gamma_1/K_{11}$, and a faster response speed. Compared with Comparative Example 7, Example 11 had a higher clearing point, a larger elastic constant $K_{11}$, a smaller $\gamma_1/K_{11}$, and a faster response speed.

Example 11 and Comparative Examples 1, 2 and 6 were subjected to an ultraviolet aging experiment and a backlight aging experiment. During the production of a liquid crystal panel, there was a process of ultraviolet curing, wherein ultraviolet light had a destructive effect on the liquid crystal material. Compared with traditional side backlight, mini LED as a backlight had a higher light intensity after it directly irradiated the liquid crystal material, and the damage to the liquid crystal material was stronger than that caused by the side backlight. Therefore, the liquid crystal material should have a certain resistance to ultraviolet light and long-time light irradiation.

Before the ultraviolet and backlight aging experiments, the VHR data of the liquid crystal composition was determined as initial VHR data; and then, the liquid crystal composition was subjected to the ultraviolet and backlight aging experiments, and the VHR data of the liquid crystal composition was determined again after the experiments.

Ultraviolet aging experiment: The liquid crystal composition was poured into a test cell and irradiated with 5000 mJ energy under an ultraviolet lamp with a wavelength of 365 nm.

Backlight aging experiment: The liquid crystal composition was poured into a test cell and placed on the mini LED backlight for 500 hours, wherein the intensity of the backlight was 15000 nit, and the mini LED backlight used in the experiment was blue LED+QD film (quantum dot film).

Residual image experiment: Irradiation was carried out on mini LED backlight for 1000 hours.

Table 16 showed the data of the ultraviolet aging and backlight aging experiments and the residual image experiment.

TABLE 16

Data of the ultraviolet aging and backlight aging experiments and the residual image experiment

| | VHR (%, initial) | VHR (%, ultraviolet) | VHR (%, backlight aging) | Residual image |
|---|---|---|---|---|
| Example 11 | 95.7 | 95.6 | 90.5 | ◉ |
| Comparative Example 1 | 95.7 | 95.5 | 88.2 | ○ |
| Comparative Example 2 | 95.8 | 94.1 | 90.5 | ◉ |
| Comparative Example 6 | 95.7 | 93.8 | 85.5 | △ |

It could be seen from the above Table 16 that compared with Comparative Examples 1 and 2, Example 11 still had a higher VHR after the ultraviolet aging and backlight aging experiments. In addition, after long-time backlight irradiation, there was no residual image defects. After the backlight aging experiment, Comparative Example 1 showed significantly reduced VHR, and after long-time use, there was a residual image defects. After the ultraviolet aging experiment, Comparative Example 2 showed significantly reduced VHR, and Mura defects easily occurred at the junction with a liquid crystal display panel frame glue. After the ultraviolet aging and backlight aging experiments, Comparative Example 6 significantly reduced VHR, and frame Mura and residual image defects easily occurred.

In summary, the liquid crystal composition provided by the present invention has the characteristics of a small rotational viscosity, a large elastic constant, a high transmittance, a fast response speed, a strong resistance to ultraviolet light irradiation, and a high long-time light stability, and is particularly suitable for the field of TV display. The TV display containing same has a high transmittance, a low energy consumption and no residual image after long-time backlight irradiation, and is suitable for making large-size mini LED backlight TV displays.

The above examples of the present invention are only to clearly illustrate the instances of the present invention, rather than defining the embodiments of the present invention. For those of ordinary skill in the art, other different forms of changes or variations can also be made on the basis of the above description. It is impossible to exhaustively list all the embodiments here, and all obvious changes or variations that are derived from the technical solution of the present invention are still within the scope of protection of the present invention.

The invention claimed is:

1. A liquid crystal composition, comprising one or more benzochromene compounds represented by Formula I, one or more compounds represented by Formula II, and one or more compounds represented by Formula III:

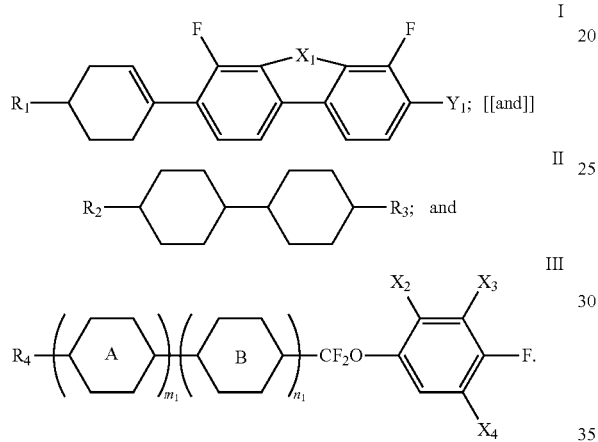

wherein in Formula I, $R_1$ represents an alkyl with a carbon atom number of 1-10, an alkoxy with a carbon atom number of 1-10 or an alkenyl with a carbon atom number of 2-10, $X_1$ represents $CH_2O$ or $OCH_2$ and $Y_1$ represents $CF_3$ or $OCF_3$, in Formula II, $R_2$ and $R_3$ each independently represent an alkyl with a carbon atom number of 1-10 or an alkenyl with a carbon atom number of 2-10, and at least one of $R_2$ and $R_3$ represents an alkenyl with a carbon atom number of 2-10, in Formula III, $R_4$ represents an alkyl with a carbon atom number of 1-10, and any one or more non-contiguous —$CH_2$— in the group represented by $R_4$ is optionally replaced by cyclopropylene or cyclopentylene, $X_2$ represents H or $CH_3$, $X_3$ and $X_4$ each independently represent H or F, and $m_1$ and $n_1$ each independently represent 1 or 2;

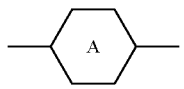

represents

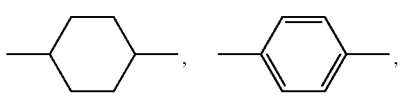

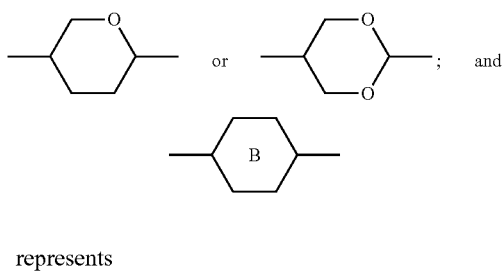

represents

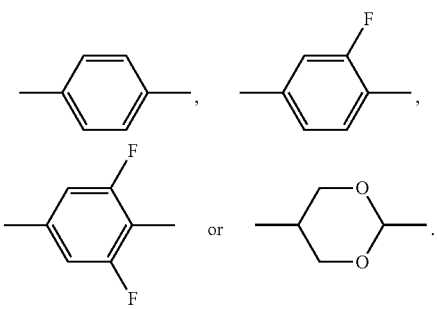

2. The liquid crystal composition according to claim 1, further comprising one or more compounds represented by Formula IV:

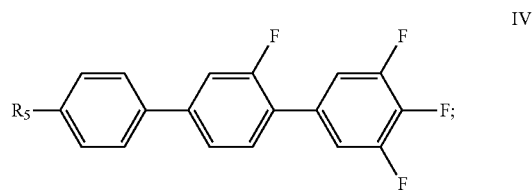

wherein in Formula IV, $R_5$ represents an alkyl with a carbon atom number of 1-10.

3. The liquid crystal composition according to claim 1, further comprising one or more compounds represented by Formula V:

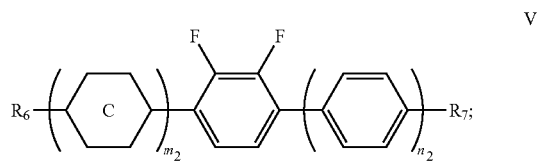

wherein in Formula V, $R_6$ and $R_7$ each independently represent an alkyl with a carbon atom number of 1-10, an alkoxy with a carbon atom number of 1-10 or an alkenyl with a carbon atom number of 2-10;

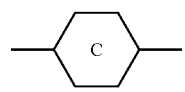

represents

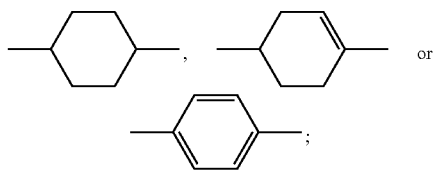

and $m_2$ represents 1 or 2, and $n_2$ represents 0 or 1.

4. The liquid crystal composition according to claim 1, further comprising one or more compounds represented by Formula VI:

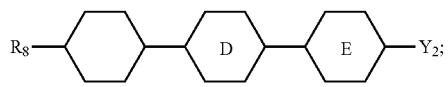

wherein in Formula VI, $R_8$ represents an alkyl with a carbon atom number of 1-10 or an alkenyl with a carbon atom number of 2-10, and $Y_2$ represents F or $OCF_3$;

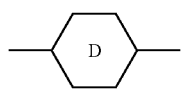

represents

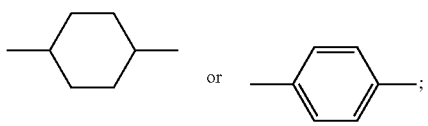

represents

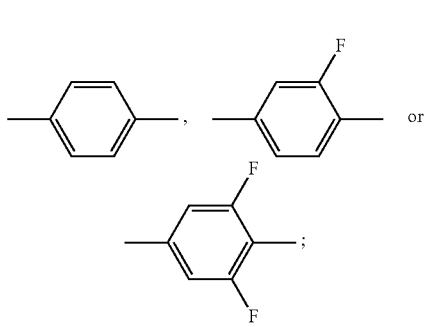

when

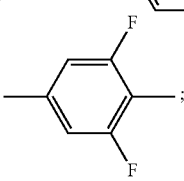

represents

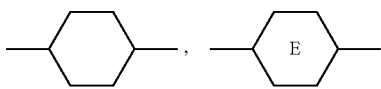

represents

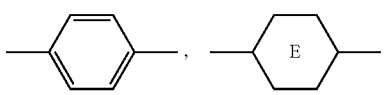

and when

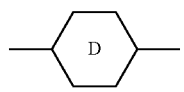

represents

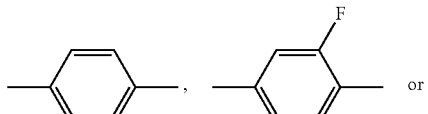

represents

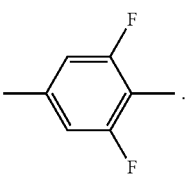

5. The liquid crystal composition according to claim 1, further comprising one or more compounds represented by Formula VII:

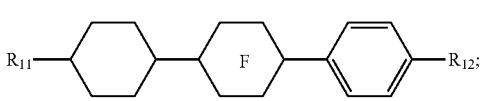

wherein in Formula VII, $R_9$ and $R_{10}$ each independently represent an alkyl with a carbon atom number of 1-10 or an alkenyl with a carbon atom number of 2-10.

6. The liquid crystal composition according to claim 1, further comprising one or more compounds represented by Formula VIII:

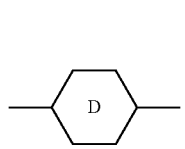

wherein in Formula VIII, $R_{11}$ and $R_{12}$ each independently represent an alkyl with a carbon atom number of 1-10 or an alkenyl with a carbon atom number of 2-10, and at least one of $R_{11}$ and $R_{12}$ represents alkenyl, and

represents

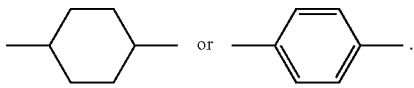

7. The liquid crystal composition according to claim 1, further comprising one or more compounds represented by Formula IX:

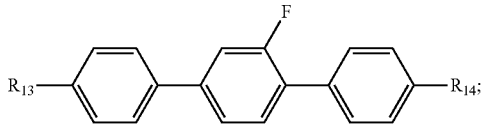

wherein in Formula IX, $R_{13}$ and $R_{14}$ each independently represent an alkyl with a carbon atom number of 1-10 or an alkenyl with a carbon atom number of 2-10, and at least one of $R_{13}$ and $R_{14}$ represents alkenyl.

8. The liquid crystal composition according to claim 1, further comprising one or more compounds represented by Formula X:

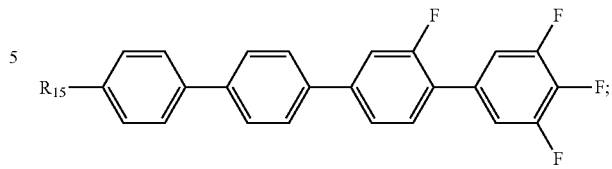

wherein in Formula X, $R_{15}$ represents an alkyl with a carbon atom number of 1-10, and any one or more non-contiguous —$CH_2$— in the group represented by $R_{15}$ is optionally replaced by cyclopentylene, cyclobutylene or cyclopropylene.

9. The liquid crystal composition according to claim 1, further comprising one or more compounds represented by Formula XI:

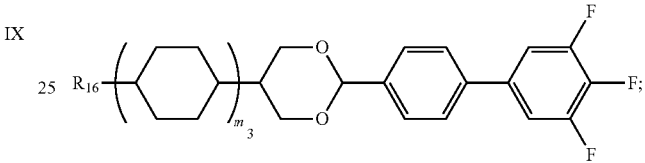

wherein in Formula XI, $R_{16}$ represents an alkyl with a carbon atom number of 1-10, and $m_3$ represents 0 or 1.

10. A liquid crystal display element or liquid crystal display, comprising the liquid crystal composition according to claim 1, and wherein the liquid crystal display element or liquid crystal display is an active matrix display element or display.

* * * * *